US012726649B2

(12) United States Patent
Zhang et al.

(10) Patent No.: US 12,726,649 B2
(45) Date of Patent: Sep. 1, 2026

(54) EFFICIENT AFFINE MERGE MOTION VECTOR DERIVATION

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijng (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/503,360

(22) Filed: Nov. 7, 2023

(65) Prior Publication Data

US 2024/0098295 A1 Mar. 21, 2024

Related U.S. Application Data

(63) Continuation of application No. 17/490,220, filed on Sep. 30, 2021, now Pat. No. 12,309,413, which is a
(Continued)

(51) Int. Cl.
*H04N 19/513* (2014.01)
*H04N 19/176* (2014.01)

(52) U.S. Cl.
CPC ......... *H04N 19/513* (2014.11); *H04N 19/176* (2014.11)

(58) Field of Classification Search
CPC ...... H04N 19/176; H04N 19/52; H04N 19/70; H04N 19/105; H04N 19/61; H04N 19/159;
(Continued)

(56) References Cited

U.S. PATENT DOCUMENTS 10,448,010 B2 10/2019 Chen
10,560,712 B2 2/2020 Zou
(Continued)

FOREIGN PATENT DOCUMENTS

CN 104322070 A 1/2015
CN 104935938 A 9/2015
(Continued)

OTHER PUBLICATIONS

Alshina et al., "Performance of JEM1.0 tools analysis by Samsung," Joint Video Exploration Team (JVET) of ITU-T SG WP 3 and ISO/IEC JTC 1/SC 29/WG 11, 2nd Meeting: San Diego, USA, Feb. 20-26, 2016, Document: JVET-B0022, 27 pages.
(Continued)

*Primary Examiner* — Farhan Mahmud
(74) *Attorney, Agent, or Firm* — Conley Rose, P.C.

(57) ABSTRACT

A video processing method for efficient affine merge motion vector derivation is disclosed. In one aspect, a video processing method is provided to include partitioning a current video block into sub-blocks; deriving, for each sub-block, a motion vector, where the motion vector for each sub-block is associated with a position for that sub-block according to a position rule; and processing a bitstream representation of the current video block using motion vectors for the sub-blocks.

18 Claims, 24 Drawing Sheets

R S
T

Related U.S. Application Data continuation of application No. 17/090,122, filed on Nov. 5, 2020, now abandoned, which is a continuation of application No. PCT/IB2019/055592, filed on Jul. 1, 2019.

(58) Field of Classification Search
CPC .... H04N 19/513; H04N 19/46; H04N 19/119; H04N 19/139; H04N 19/51
See application file for complete search history.

(56) References Cited

U.S. PATENT DOCUMENTS

| | | | | |
|---|---|---|---|---|
| 10,757,417 | B2 | 8/2020 | Zhang | |
| 10,778,999 | B2 | 9/2020 | Li | |
| 10,841,609 | B1 | 11/2020 | Liu | |
| 12,309,413 | B2 | 5/2025 | Zhang et al. | |
| 2003/0072374 | A1 | 4/2003 | Sohm | |
| 2011/0080954 | A1 | 4/2011 | Bossen | |
| 2014/0003527 | A1 | 1/2014 | Tourapis | |
| 2015/0085930 | A1 | 3/2015 | Zhang | |
| 2017/0214932 | A1 | 7/2017 | Huang | |
| 2017/0332095 | A1 | 11/2017 | Zou | |
| 2018/0098063 | A1 | 4/2018 | Chen | |
| 2018/0359483 | A1* | 12/2018 | Chen | H04N 19/44 |
| 2019/0387250 | A1 | 12/2019 | Boyce | |
| 2020/0045310 | A1 | 2/2020 | Chen | |
| 2020/0145688 | A1 | 5/2020 | Zou | |
| 2020/0213594 | A1 | 7/2020 | Liu | |
| 2020/0213612 | A1 | 7/2020 | Liu | |
| 2020/0359029 | A1 | 11/2020 | Liu | |
| 2020/0382771 | A1 | 12/2020 | Liu | |
| 2020/0382795 | A1 | 12/2020 | Zhang | |
| 2020/0396453 | A1 | 12/2020 | Zhang | |
| 2020/0396465 | A1 | 12/2020 | Zhang | |
| 2021/0058637 | A1 | 2/2021 | Zhang | |

FOREIGN PATENT DOCUMENTS

| | | | |
|---|---|---|---|
| CN | 105794210 | A | 7/2016 |
| CN | 106303543 | A | 1/2017 |
| CN | 106537915 | A | 3/2017 |
| CN | 106559669 | A | 4/2017 |
| CN | 107113424 | A | 8/2017 |
| CN | 107113446 | A | 8/2017 |
| CN | 107211157 | A | 9/2017 |
| CN | 107925758 | A | 4/2018 |
| CN | 107948657 | A | 4/2018 |
| CN | 108141582 | A | 6/2018 |
| CN | 108141589 | A | 6/2018 |
| IN | 538444 | A | 5/2024 |
| JP | 2016536817 | A | 11/2016 |
| JP | 2018511234 | A | 4/2018 |
| TW | 202005389 | A | 1/2020 |
| WO | 2017048345 | A1 | 3/2017 |
| WO | 2017118411 | A1 | 7/2017 |
| WO | 2017148345 | A1 | 9/2017 |
| WO | 2017164441 | A1 | 9/2017 |
| WO | 2018065397 | A2 | 4/2018 |
| WO | 2018110180 | A1 | 6/2018 |

OTHER PUBLICATIONS

ITU-T: "Series H: Audiovisual and Multimedia Systems Infrastructure of Audiovisual Services—Coding of moving Video," Versatile Video Coding, Recommendation ITU-T H.266, Apr. 2022, 536 Pages, [Retrieved on Feb. 28, 2023] Retrieved from URL: https://handle.itu.int/11.1002/1000/14336.

Notice of Reasons for Refusal for Japanese Patent Application No. 2023187705, mailed Oct. 1, 2024, 8 pages.

ITU-T H.265 "High efficiency video coding" Series H: Audiovisual and Multimedia Systems Infrastructure of audiovisual services—Coding of moving video, Telecommunication Standardization Sector of ITU, Available at address: https://www.itu.int/rec/T-REC-H.265 (Nov. 2019).

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

JEM-7.0: https://jvet.hhi.fraunhofer.de/svn/svn_HMJEMSoftware/tags/ HM-16.6-JEM-7.0, Sep. 29, 2021.

Zhang et al. "Merge Mode for Deformable Block Motion Information Derivation," IEEE Transactions on Circuits and Systems for Video Technology, Nov. 2017, 27(11):2437-2449.

Alshina et al. "Performance of JEM1.0 Tools Analysis by Sam sung," Joint Video Exploration Team (JVET) of ITU-T SG 16 WP3 and ISO/IEC JTC 1/SC 29/WG 11, 2nd Meeting, San Diego, USA, Feb. 20-26, 2016, document JVET-B0022, 2016.

Hsu et al. "Description of Core Experiment 10: Combined and Multihypothesis Prediction," Joint Video Experts Team (JVET) of ITU-T SG 16 WP 3 and ISO/IEC JTC 1/SC 29/WG 11, 10th Meeting, San Diego, US, Apr. 10-20, 2018, document JVET-J1030, 2018.

Guo et al. "CE2: Overlapped Block Motion Compensation for Geometry Partition Block," Joint Collaborative Team on Video Coding (JCT-VC) of ITU-T SG16 WP3 and ISO/IEC JTC1/SC29/WG11, 4th Meeting, Daegu, KR, Jan. 20-28, 2011, document JCTVC-D368, 2011.

Hsu et al. "Description of Core Experiment 10: Combined and Multihypothesis Prediction," Joint Video Experts Team (JVET) of ITU-T SG 16 WP 3 and ISO/IEC JTC 1/SC 29/WG 11, 1oth Meeting, San Diego, US, Apr. 10-20, 2018, document JVET-J1030, 2018.

Zhang et al. "CE4-Related: Interweaved Prediction for Affine Motion Compensation," Joint Video Experts Team (JVET) of ITU-T SG 16 WP 3 and ISO/IECJTC 1/SC 29/WG 11, 11th Meeting, Ljubljana, SI, Jul. 10-18, 2018. ocument JVET-K0102, 2018.

Zhang et al. "CE10: Interweaved Prediction for Affine Motion Compensation (Test 10.5.1 and Test 10.5.2)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0269, 2018.

Zhang et al. "Non-CE2: Interweaved Prediction for Affine Motion Compensation," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0268, 2019.

Li et al. "CE2-Related: Simplifications of Interweaved Affine Mode," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0399, 2019.

Lee et al. "OBMC for IVC+," International Organisation for Standardisation, ISO/IEC JTC1/SC29/WG11, Coding of Moving Pictures and Audio, Oct. 2016, Chengdu, China.

Chen et al. "Algorithm Description of Joint Exploration Test Model 4," Joint Video Exploration Team (JVET) of ITU-T SG 16 WP 3 and ISO/IEC JTC 1/SC 29/WG 11, 4th Meeting: Chengdu, CN, Oct. 15-21, 2016, document JVET-D1001, 2016.

Document: JVET-J0021-v5, Chen, Y., et al., "Description of SDR, HDR and 360 video coding technology proposal by Qualcomm and Technicolor—low and high complexity versions," Joint Video Exploration Team (JVET) of ITU-T SG 16 WP 3 and ISO/IEC JTC 1/SC 29/WG 11, 10th Meeting: San Diego, US, Apr. 10-20, 2018, 43 pages.

Non Final Office Action from U.S. Appl. No. 17/090,122 dated Jan. 25, 2021.

Final Office Action from U.S. Appl. No. 17/090,122 dated Jun. 3, 2021.

International Search Report and Written Opinion from PCT/182019/055566 dated Sep. 26, 2019 (22 pages).

International Search Report and Written Opinion from PCT/182019/055592 dated Nov. 21, 2019 (18 pages).

Non Final Office Action from U.S. Appl. No. 17/490,220 dated Sep. 2, 2022.

Final Office Action from U.S. Appl. No. 17/490,220 dated Mar. 16, 2023.

(56) References Cited

OTHER PUBLICATIONS

Non Final Office Action from U.S. Appl. No. 17/490,220 dated Sep. 14, 2023.
Office Action from European Application No. 19740074.0 dated Jan. 26, 2024.
Decision of Refusal for Japanese Application No. 2023-187705, mailed Apr. 1, 2025, 7 pages.
Second Examination Opinion Notice for Chinese Patent Application No. 202210066664.2, mailed on May 28, 2025, 22 pages.
First Office Action for Chinese Application No. 202210066664.2, mailed on Dec. 27, 2024, 23 pages.
Document: JVET-J0057, Chen, X., et al., "DMVR extension based on template matching," Joint Video Exploration Team (JVET) of ITU-T SG 16 WP 3 and ISO/IEC JTC 1/SC 29/WG 11 10th Meeting: San Diego, US, Apr. 10-20, 2018, 3 pages.
Chinese Notice of Allowance from Chinese Patent Application No. 202210066664.2 dated Sep. 1, 2025, 6 pages.

* cited by examiner

EFFICIENT AFFINE MERGE MOTION VECTOR DERIVATION

CROSS-REFERENCE TO RELATED APPLICATIONS

This application is a continuation of U.S. application Ser. No. 17/490,220, filed on Sep. 30, 2021, which is a continuation of U.S. application Ser. No. 17/090,122, filed on Nov. 5, 2020, which is a continuation of International Application No. PCT/IB2019/055592, filed on Jul. 1, 2019, which claims the priority to and benefits of International Patent Application No. PCT/CN2018/093943, filed on Jul. 1, 2018, PCT/CN2018/095568, filed on Jul. 13, 2018. All the aforementioned patent applications are hereby incorporated by reference in their entireties.

TECHNICAL FIELD

The present disclosure relates to video coding and decoding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

This disclosure discloses techniques that can be used in video coding and decoding embodiments to improve performance of sub-block based coding, and in particular, when using affine motion coding mode.

In one example aspect, a video processing method is provided to include partitioning a current block into sub-blocks; deriving, for each sub-block, a motion vector, wherein the motion vector for each sub-block is associated with a position for that sub-block according to a position rule; and processing a bitstream representation of the current block using motion vectors for the sub-blocks.

In another aspect, a video processing method is provided to comprise: deriving, for a conversion between a current block and a bitstream representation of the current block using affine mode, motion vectors at control points of the current block based on a position rule; and performing the conversion between the current block and the bitstream representation using the motion vectors, and wherein the position rule specifies to exclude use of non-adjacent neighboring blocks for the deriving.

In another aspect, a method of video processing is provided to comprise: determining, for a conversion between a current block and a bitstream representation of the current block, a list of affine merge candidates for the conversion by including merge candidates from one or more neighboring block that satisfy a validity criterion based on positions of the one or more neighboring blocks; and performing the conversion between the current block and the bitstream representation using motion vectors.

In yet another example aspect, a video encoder device that implements a video encoding method described herein is disclosed.

In yet another representative aspect, the various techniques described herein may be embodied as a computer program product stored on a non-transitory computer readable media. The computer program product includes program code for carrying out the methods described herein.

In yet another representative aspect, a video decoder apparatus may implement a method as described herein.

The details of one or more implementations are set forth in the accompanying attachments, the drawings, and the description below. Other features will be apparent from the description and drawings, and from the claims.

BRIEF DESCRIPTION OF THE DRAWINGS

FIG. 9A shows an example of access positions outside of the block and FIG. 9B shows an example of padding used in order to avoid extra memory access and calculation.

DETAILED DESCRIPTION

Section headings are used in the present disclosure to improve readability and do not limit the techniques and embodiments described in a section to only that section.

To improve compression ratio of video, researchers are continually looking for new techniques by which to encode video.

1. Introduction

The present disclosure is related to video/image coding technologies. Specifically, it is related to sub-block based prediction in video/image coding. It may be applied to the existing video coding standard like High Efficiency Video Coding (HEVC), or the standard Versatile Video Coding (VVC) to be finalized. It may be also applicable to future video/image coding standards or video/image codec.

Brief Discussion

Figure 1:
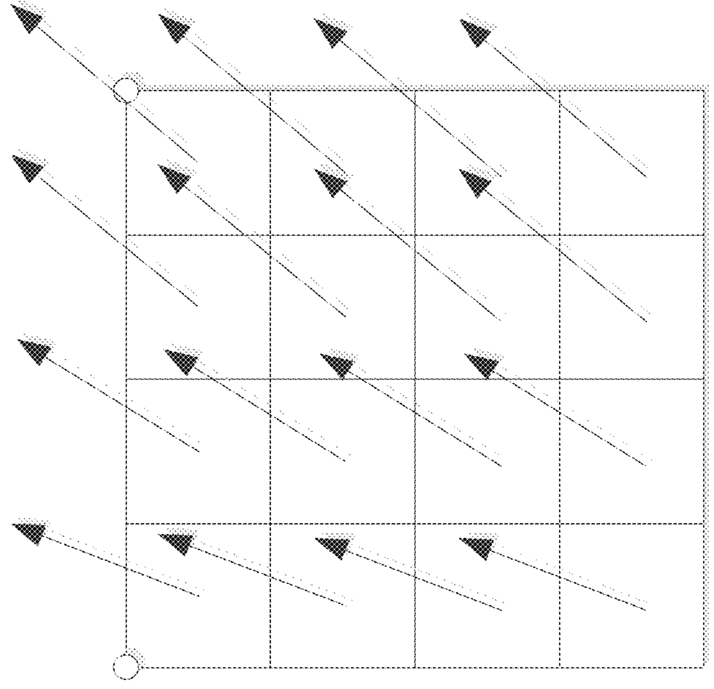
FIG. 1 shows an example of sub-block based prediction.

Sub-block based prediction is first introduced into the video coding standard by HEVC Annex I (three dimensional (3D)-HEVC). With sub-block based prediction, a block, such as a Coding Unit (CU) or a Prediction Unit (PU), is divided into several non-overlapped sub-blocks. Different sub-block may be assigned different motion information, such as reference index or Motion Vector (MV), and Motion Compensation (MC) is performed individually for each sub-block. FIG. 1 demonstrates the concept of sub-block based prediction.

To explore the future video coding technologies beyond HEVC, Joint Video Exploration Team (JVET) was founded by Video Coding Experts Group (VCEG) and Moving Picture Experts Group (MPEG) jointly in 2015. Since then, many new methods have been adopted by JVET and put into the reference software named Joint Exploration Model (JEM).

In JEM, sub-block based prediction is adopted in several coding tools, such as affine prediction, Alternative temporal motion vector prediction (ATMVP), spatial-temporal motion vector prediction (STMVP), Bi-directional Optical flow (BIO) and Frame-Rate Up Conversion (FRUC).

2.1 Affine Prediction

Figure 2:
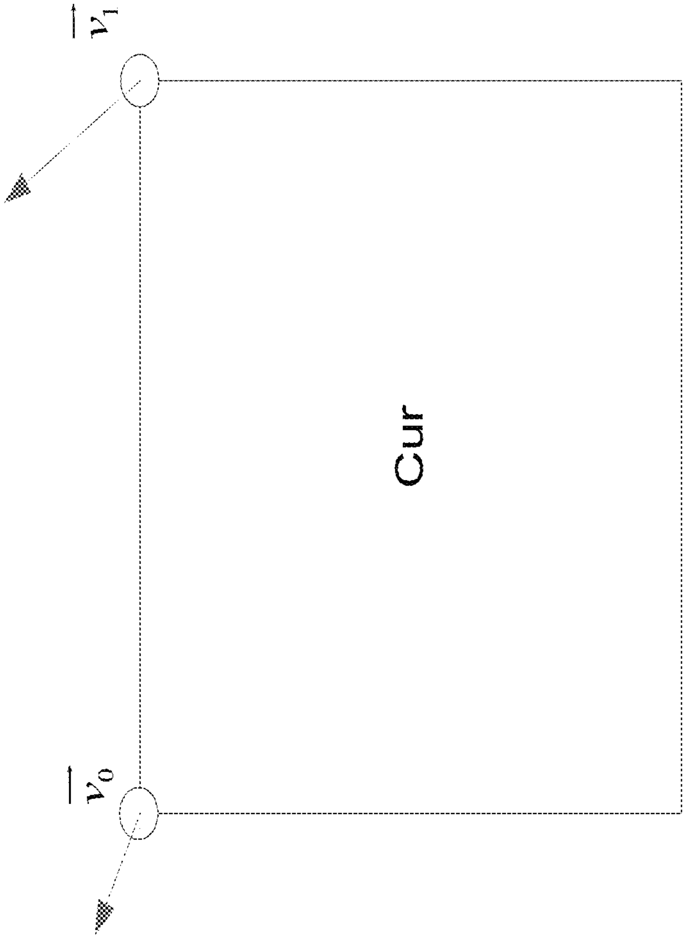
FIG. 2 illustrates an example of simplified affine motion model.

In HEVC, only translation motion model is applied for motion compensation prediction (MCP). While in the real world, there are many kinds of motion, e.g., zoom in/out, rotation, perspective motions and the other irregular motions. In the JEM, a simplified affine transform motion compensation prediction is applied. As shown FIG. 2, the affine motion field of the block is described by two control point motion vectors.

The motion vector field (MVF) of a block is described by the following equation:

$$\begin{cases} v_x = ax - by + c = \dfrac{(v_{1x} - v_{0x})}{w}x - \dfrac{(v_{1y} - v_{0y})}{w}y + v_{0x} \\ v_y = bx + ay + d = \dfrac{(v_{1y} - v_{0y})}{w}x + \dfrac{(v_{1x} - v_{0x})}{w}y + v_{0y} \end{cases} \tag{1}$$

Where $(v_{0x}, v_{0y})$ is motion vector of the top-left corner control point, and $(v_{1x}, v_{1y})$ is motion vector of the top-right corner control point.

In order to further simplify the motion compensation prediction, sub-block based affine transform prediction is applied. The sub-block size M×N is derived as in Eq. (2), where MvPre is the motion vector fraction accuracy (1/16 in JEM), $(v_{2x}, v_{2y})$ is motion vector of the bottom-left control point, calculated according to Equation 1.

$$\begin{cases} M = \text{clip3}\left(4, w, \dfrac{w \times MvPre}{\max(\text{abs}(v_{1x} - v_{0x}), \text{abs}(v_{1y} - v_{0y}))}\right) \\ N = \text{clip3}\left(4, h, \dfrac{h \times MvPre}{\max(\text{abs}(v_{2x} - v_{0x}), \text{abs}(v_{2y} - v_{0y}))}\right) \end{cases} \tag{2}$$

After derived by Eq. (2), M and N should be adjusted downward if necessary to make it a divisor of w and h, respectively.

Figure 3:
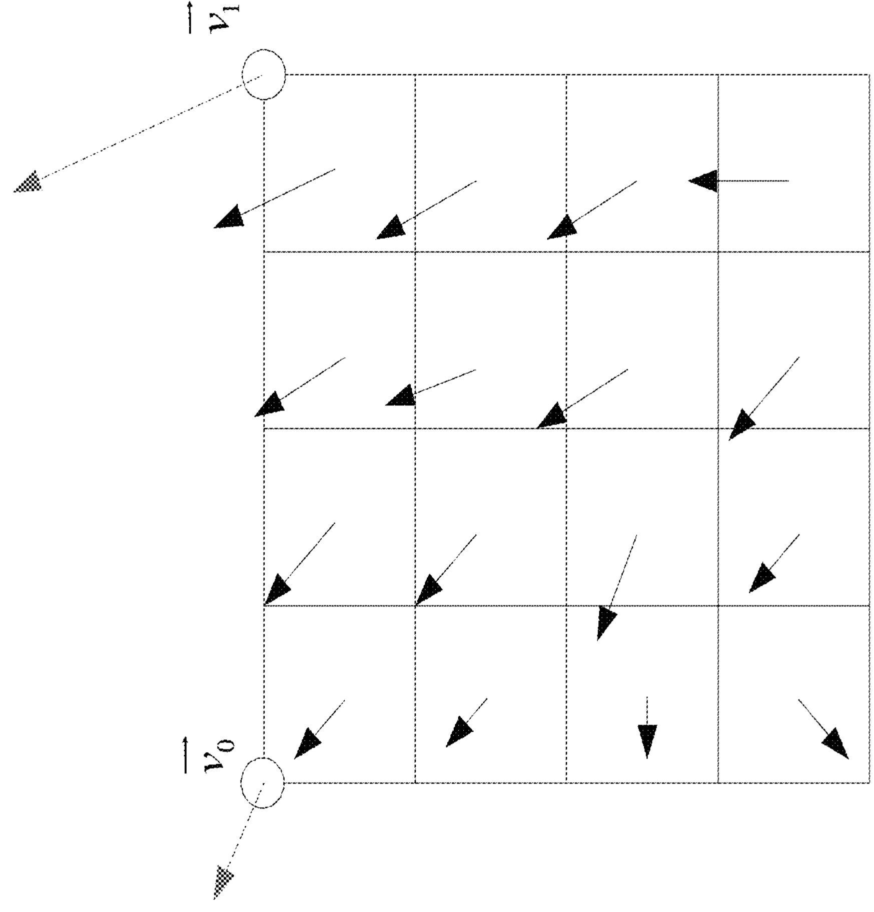
FIG. 3 shows an example of affine motion vector field (MVF) per sub-block.

To derive motion vector of each M×N sub-block, the motion vector of the center sample of each sub-block, as shown in FIG. 3, is calculated according to Eq. (1), and rounded to 1/16 fraction accuracy. Then the motion compensation interpolation filters are applied to generate the prediction of each sub-block with derived motion vector.

After MCP, the high accuracy motion vector of each sub-block is rounded and saved as the same accuracy as the normal motion vector.

Figure 4:
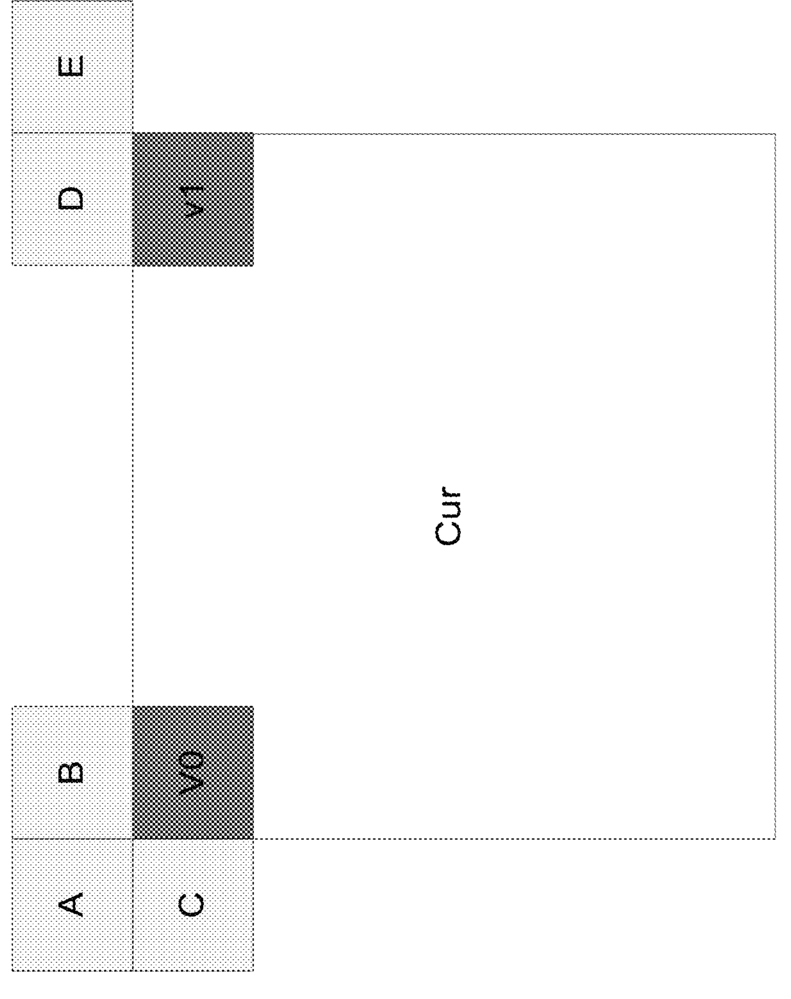
FIG. 4 shows an example of motion vector prediction (MVP) for AF_INTER mode.

In the JEM, there are two affine motion modes: AF_INTER mode and AF_MERGE mode. For CUs with both width and height larger than 8, AF_INTER mode can be applied. An affine flag in CU level is signalled in the bitstream to indicate whether AF_INTER mode is used. In this mode, a candidate list with motion vector pair $\{(v_0,v_1) | v_0=\{v_A,v_B,v_C\}, v_1=\{v_D,v_E\}\}$ is constructed using the neighbour blocks. As shown in FIG. 4, $v_0$ is selected from the motion vectors of the block A, B or C. The motion vector from the neighbour block is scaled according to the reference list and the relationship among the picture order count (POC) of the reference for the neighbour block, the POC of the reference for the current CU and the POC of the current CU. And the approach to select $v_1$ from the neighbour block D and E is similar. If the number of candidate list is smaller than 2, the list is padded by the motion vector pair composed by duplicating each of the AMVP candidates. When the candidate list is larger than 2, the candidates are firstly sorted according to the consistency of the neighbouring motion vectors (similarity of the two motion vectors in a pair candidate) and only the first two candidates are kept. A rate distortion (RD) cost check is used to determine which motion vector pair candidate is selected as the control point motion vector prediction (CPMVP) of the current CU. And an index indicating the position of the CPMVP in the candidate list is signalled in the bitstream. After the CPMVP of the current affine CU is determined, affine motion estimation is applied and the control point motion vector (CPMV) is found. Then the difference of the CPMV and the CPMVP is signalled in the bitstream.

Figures 5A, 5B:
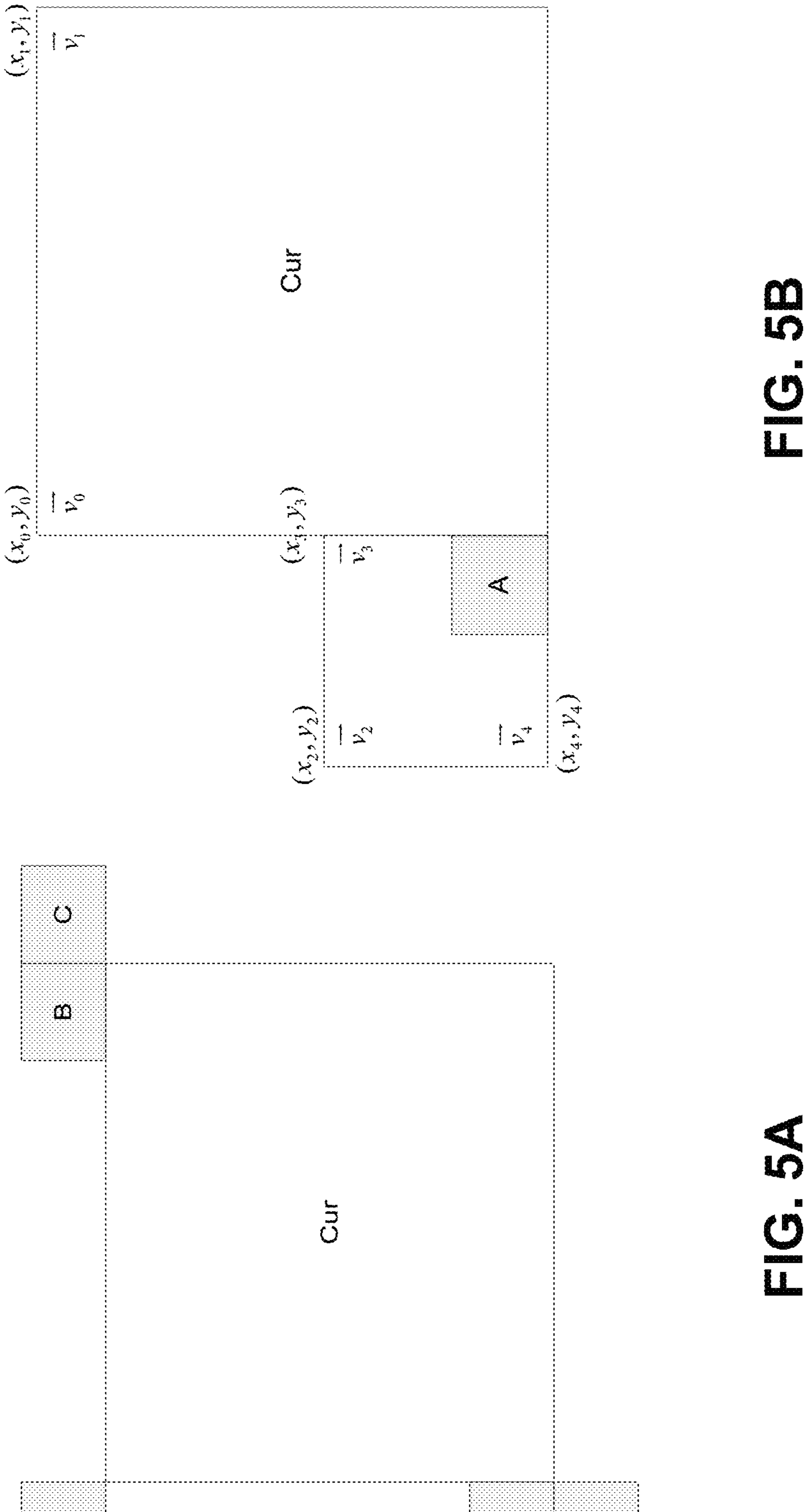
FIG. 5A and FIG. 5B depict examples of candidates for AF_MERGE encoding mode.

When a CU is applied in AF_MERGE mode, it gets the first block coded with affine mode from the valid neighbour reconstructed blocks. And the selection order for the candidate block is from left, above, above right, left bottom to above left as shown in FIG. 5A. If the neighbour left bottom block A is coded in affine mode as shown in FIG. 5B, the motion vectors $v_2$, $v_3$ and $v_4$ of the top left corner, above right corner and left bottom corner of the CU which contains the block A are derived. And the motion vector $v_0$ of the top left corner on the current CU is calculated according to $v_2$, $v_3$ and $v_4$. Secondly, the motion vector $v_1$ of the above right of the current CU is calculated.

After the CPMV of the current CU $v_0$ and $v_1$ are derived, according to the simplified affine motion model Eq (1), the MVF of the current CU is generated. In order to identify whether the current CU is coded with AF_MERGE mode, an affine flag is signalled in the bitstream when there is at least one neighbour block is coded in affine mode.

2.2 ATMVP

Figure 6:
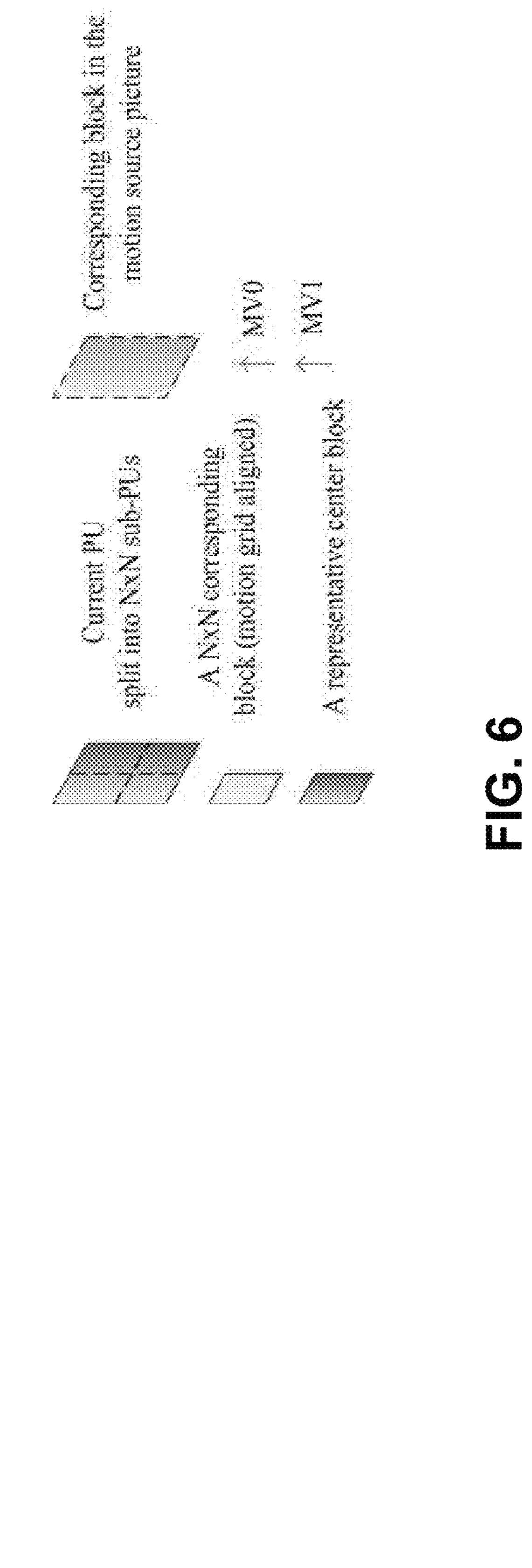
FIG. 6 shows an example process of advanced temporal motion vector predictor (ATMVP) motion prediction for a coding unit (CU).

In the alternative temporal motion vector prediction (ATMVP) method, the motion vectors temporal motion vector prediction (TMVP) is modified by fetching multiple sets of motion information (including motion vectors and reference indices) from blocks smaller than the current CU. As shown in FIG. 6, the sub-CUs are square N×N blocks (N is set to 4 by default).

ATMVP predicts the motion vectors of the sub-CUs within a CU in two steps. The first step is to identify the corresponding block in a reference picture with a so-called temporal vector. The reference picture is called the motion source picture. The second step is to split the current CU into sub-CUs and obtain the motion vectors as well as the reference indices of each sub-CU from the block corresponding to each sub-CU, as shown in FIG. 6.

In the first step, a reference picture and the corresponding block is determined by the motion information of the spatial neighbouring blocks of the current CU. To avoid the repetitive scanning process of neighbouring blocks, the first merge candidate in the merge candidate list of the current CU is used. The first available motion vector as well as its associated reference index are set to be the temporal vector and the index to the motion source picture. This way, in ATMVP, the corresponding block may be more accurately identified, compared with TMVP, wherein the corresponding block (sometimes called collocated block) is always in a bottom-right or center position relative to the current CU.

In the second step, a corresponding block of the sub-CU is identified by the temporal vector in the motion source picture, by adding to the coordinate of the current CU the temporal vector. For each sub-CU, the motion information of its corresponding block (the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (i.e., the POCs of all reference pictures of the current picture are smaller than the POC of the current picture) is fulfilled and possibly uses motion vector $Mv_x$ (the motion vector corresponding to reference picture list X) to predict motion vector $Mv_y$ (with X being equal to 0 or 1 and Y being equal to 1−X) for each sub-CU.

3. STMVP

Figure 7:
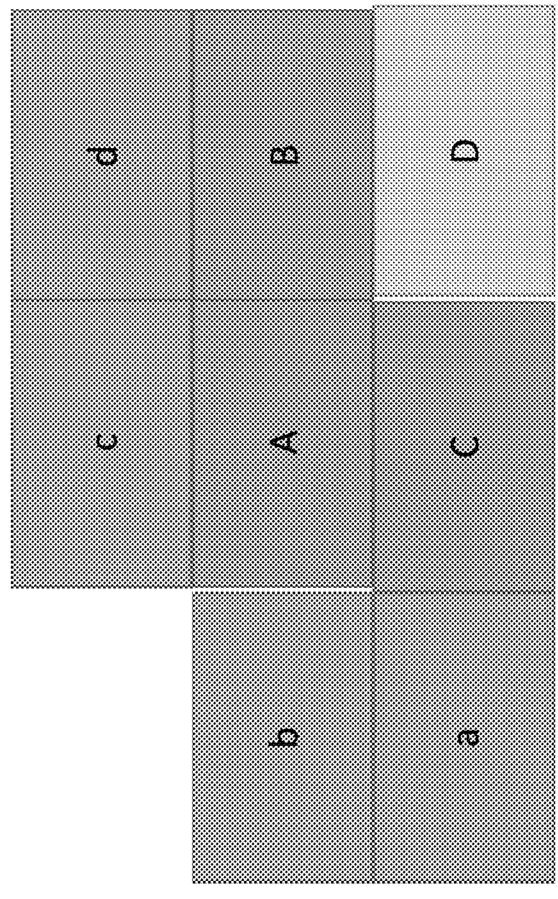
FIG. 7 shows an example of one CU with four sub-blocks (A-D) and its neighboring blocks (a-d).

In this method, the motion vectors of the sub-CUs are derived recursively, following raster scan order. FIG. 7 illustrates this concept. Let us consider an 8×8 CU which contains four 4×4 sub-CUs A, B, C, and D. The neighbouring 4×4 blocks in the current frame are labelled as a, b, c, and d.

The motion derivation for sub-CU A starts by identifying its two spatial neighbours. The first neighbour is the N×N block above sub-CU A (block c). If this block c is not available or is intra coded the other N×N blocks above sub-CU A are checked (from left to right, starting at block c). The second neighbour is a block to the left of the sub-CU A (block b). If block b is not available or is intra coded other blocks to the left of sub-CU A are checked (from top to bottom, staring at block b). The motion information obtained from the neighbouring blocks for each list is scaled to the first reference frame for a given list. Next, temporal motion vector predictor (TMVP) of sub-block A is derived by following the same procedure of TMVP derivation as specified in HEVC. The motion information of the collocated block at location D is fetched and scaled accordingly. Finally, after retrieving and scaling the motion information, all available motion vectors (up to 3) are averaged separately for each reference list. The averaged motion vector is assigned as the motion vector of the current sub-CU.

4. BIO

Bi-directional Optical flow (BIO) is sample-wise motion refinement which is performed on top of block-wise motion compensation for bi-prediction. The sample-level motion refinement doesn't use signalling.

Let $I^{(k)}$ be the luma value from reference k (k=0, 1) after block motion compensation, and $\partial I^{(k)}/\partial x$, $\partial I^{(k)}/\partial y$ are horizontal and vertical components of the $I^{(k)}$ gradient, respectively. Assuming the optical flow is valid, the motion vector field $(v_x, v_y)$ is given by an equation:

$$\partial I^{(k)}/\partial t + v_x \partial I^{(k)}/\partial x + v_y \partial I^{(k)}/\partial y = 0. \tag{3}$$

Combining this optical flow equation with Hermite interpolation for the motion trajectory of each sample results in a unique third-order polynomial that matches both the function values $I^{(k)}$ and derivatives $\partial I^{(k)}/\partial x$, $\partial I^{(k)}/\partial y$ at the ends. The value of this polynomial at t=0 is the $$pred_{BIO} = 1/2\big(I^{(0)} + I^{(1)} + v_x/2 \cdot \big(\tau_1 \partial I^{(1)}/\partial x - \tau_0 \partial I^{(0)}/\partial x\big) + v_y/2 \cdot \big(\tau_1 \partial I^{(1)}/\partial y - \tau_0 \partial I^{(0)}/\partial y\big)\big). \tag{4}$$

Figure 8:
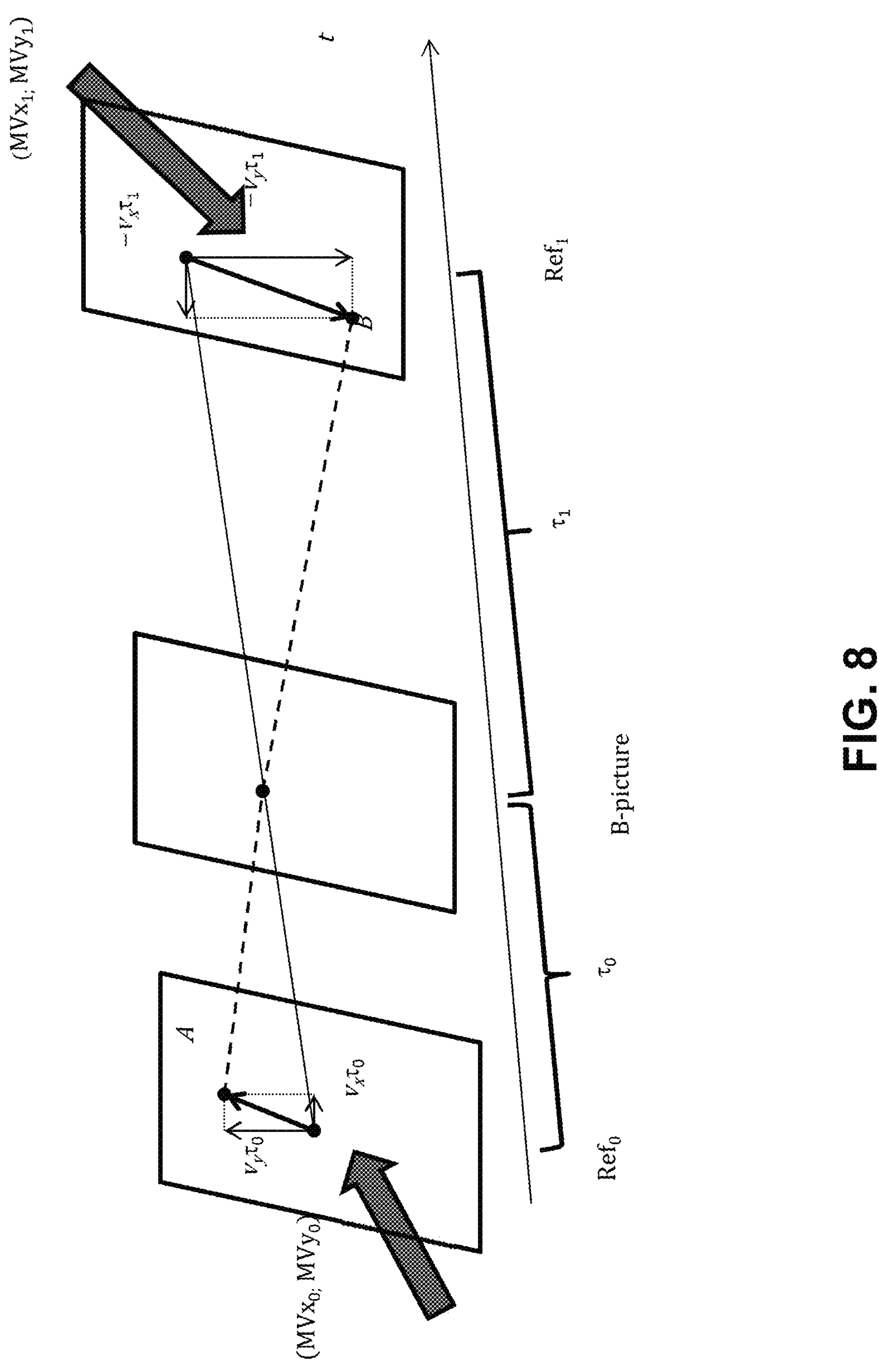
FIG. 8 shows an example of optical flow trajectory in video coding.

Here, $\tau_0$ and $\tau_1$ denote the distances to the reference frames as shown on a FIG. 8. Distances $\tau_0$ and $\tau_1$ are calculated based on POC for Ref0 and Ref1: $\tau_0$=POC(current)−POC(Ref0), $\tau_1$=POC(Ref1)−POC(current). If both predictions come from the same time direction (either both from the past or both from the future) then the signs are different (i.e., $\tau_0 \cdot \tau_1 < 0$). In this case, BIO is applied only if the prediction is not from the same time moment (i.e., $\tau_0 \neq \tau_1$), both referenced regions have non-zero motion ($MVx_0$, $MVy_0$, $MVx_1$, $MVy_1 \neq 0$) and the block motion vectors are proportional to the time distance ($MVx_0/MVx_1 = MVy_0/MVy_1 = -\tau_0/\tau_1$).

Figure 9B:
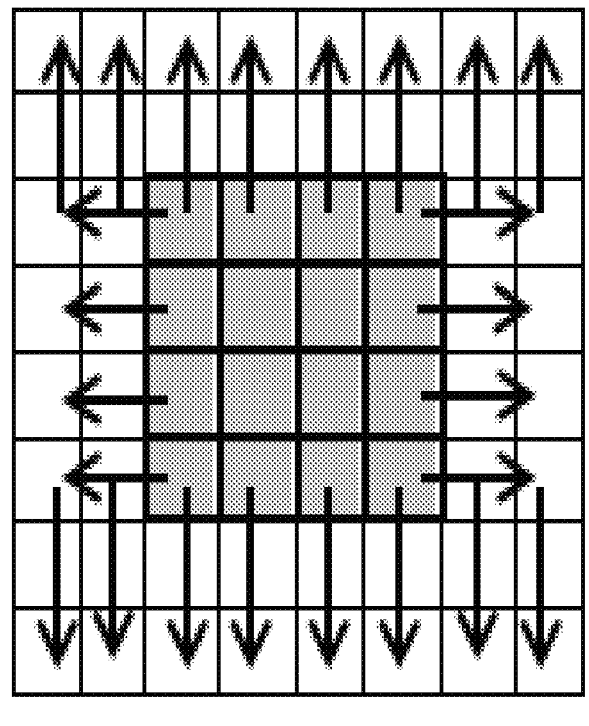
FIGS. 9A and 9B shows an example of bi-directional optical (BIO) coding technique without block extension.
Figure 9A:
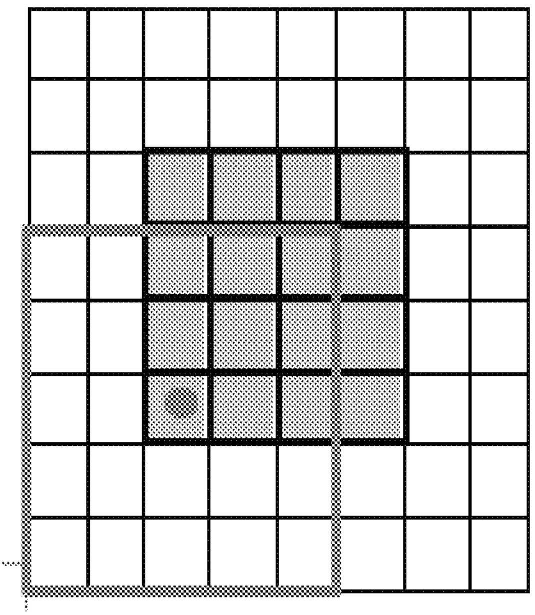

The motion vector field ($v_x, v_y$) is determined by minimizing the difference $\Delta$ between values in points A and B (intersection of motion trajectory and reference frame planes on FIGS. 9A and 9B). Model uses only first linear term of a local Taylor expansion for $\Delta$:

$$\Delta = \left(I^{(0)} - I_0^{(1)} + v_x\left(\tau_1 \partial I^{(1)}/\partial x + \tau_0 \partial I^{(0)}/\partial x\right) + v_y\left(\tau_1 \partial I^{(1)}/\partial y - \tau_0 \partial I^{(0)}/\partial y\right)\right) \tag{5}$$

All values in the above equation depend on the sample location (i',j'), which was omitted from the notation so far. Assuming the motion is consistent in the local surrounding area, we minimize $\Delta$ inside the (2M+1)×(2M+1) square window $\Omega$ centered on the currently predicted point (i,j), where M is equal to 2:

$$(v_x, v_y) = \underset{v_x, v_y}{\operatorname{argmin}} \sum_{[i',j] \in \Omega} \Delta^2[i', j'] \tag{6}$$

For this optimization problem, the JEM uses a simplified approach making first a minimization in the vertical direction and then in the horizontal direction. This results in:

$$v_x = (s_1 + r) > m\,?\,\text{clip3}\left(-thBIO,\ thBIO,\ -\frac{s_3}{(s_1 + r)}\right) : 0 \tag{7}$$

$$v_y = (s_5 + r) > m\,?\,\text{clip3}\left(-thBIO,\ thBIO,\ -\frac{s_6 - v_x s_2/2}{(s_5 + r)}\right) : 0 \tag{8}$$

where, (9)

$$s_1 = \sum_{[i',j] \in \Omega} \left(\tau_1 \partial I^{(1)}/\partial x + \tau_0 \partial I^{(0)}/\partial x\right)^2;$$

$$s_3 = \sum_{[i',j] \in \Omega} \left(I^{(1)} - I^{(0)}\right)\left(\tau_1 \partial I^{(1)}/\partial x + \tau_0 \partial I^{(0)}/\partial x\right);$$

$$s_2 = \sum_{[i',j] \in \Omega} \left(\tau_1 \partial I^{(1)}/\partial x + \tau_0 \partial I^{(0)}/\partial x\right)\left(\tau_1 \partial I^{(1)}/\partial y + \tau_0 \partial I^{(0)}/\partial y\right);$$

$$s_5 = \sum_{[i',j] \in \Omega} \left(\tau_1 \partial I^{(1)}/\partial y + \tau_0 \partial I^{(0)}/\partial y\right)^2;$$

$$s_6 = \sum_{[i',j] \in \Omega} \left(I^{(1)} - I^{(0)}\right)\left(\tau_1 \partial I^{(1)}/\partial y + \tau_0 \partial I^{(0)}/\partial y\right)$$

In order to avoid division by zero or a very small value, regularization parameters r and m are introduced in Eq (7) and Eq (8).

$$r = 500 \cdot 4^{d-8} \tag{10}$$

$$m = 700 \cdot 4^{d-8}$$

Here d is bit depth of the video samples.

In order to keep the memory access for BIO the same as for regular bi-predictive motion compensation, all prediction and gradients values, $I^{(k)}, \partial I^{(k)}/\partial x, \partial I^{(k)}/\partial y$, are calculated only for positions inside the current block. In Eq. (9), (2M+1)×(2M+1) square window $\Omega$ centered in currently predicted point on a boundary of predicted block needs to accesses positions outside of the block (as shown in FIG. 9A). In the JEM, values of $I^{(k)}, \partial I^{(k)}/\partial x, \partial I^{(k)}/\partial y$ outside of the block are set to be equal to the nearest available value inside the block. For example, this can be implemented as padding, as shown in FIG. 9B.

With BIO, it's possible that the motion field can be refined for each sample. To reduce the computational complexity, a block-based design of BIO is used in the JEM. The motion refinement is calculated based on 4×4 block. In the block-based BIO, the values of $s_n$ in Eq. (9) of all samples in a 4×4 block are aggregated, and then the aggregated values of $s_n$ in are used to derived BIO motion vectors offset for the 4×4 block. More specifically, the following formula is used for block-based BIO derivation:

$$s_{1,b_k} = \sum_{(x,y) \in b_k} \sum_{[i',j] \in \Omega(x,y)} \left(\tau_1 \partial I^{(1)}/\partial x + \tau_0 \partial I^{(0)}/\partial x\right)^2; \tag{12}$$

$$s_{3,b_k} = \sum_{(x,y) \in b_k} \sum_{[i',j] \in \Omega} \left(I^{(1)} - I^{(0)}\right)\left(\tau_1 \partial I^{(1)}/\partial x + \tau_0 \partial I^{(0)}/\partial x\right);$$

$$s_{2,b_k} = \sum_{(x,y) \in b_k} \sum_{[i',j] \in \Omega} \left(\tau_1 \partial I^{(1)}/\partial x + \tau_0 \partial I^{(0)}/\partial x\right)\left(\tau_1 \partial I^{(1)}/\partial y + \tau_0 \partial I^{(0)}/\partial y\right);$$

$$s_{5,b_k} = \sum_{(x,y) \in b_k} \sum_{[i',j] \in \Omega} \left(\tau_1 \partial I^{(1)}/\partial y + \tau_0 \partial I^{(0)}/\partial y\right)^2;$$

$$s_{6,b_k} = \sum_{(x,y) \in b_k} \sum_{[i',j] \in \Omega} \left(I^{(1)} - I^{(0)}\right)\left(\tau_1 \partial I^{(1)}/\partial y + \tau_0 \partial I^{(0)}/\partial y\right)$$

where $b_k$ denotes the set of samples belonging to the k-th 4×4 block of the predicted block. $s_n$ in Eq (7) and Eq (8) are replaced by $((s_{n,bk})>>4)$ to derive the associated motion vector offsets.

In some cases, motion vector (MV) regiment of BIO might be unreliable due to noise or irregular motion. Therefore, in BIO, the magnitude of MV regiment is clipped to a threshold value thBIO. The threshold value is determined based on whether the reference pictures of the current picture are all from one direction. If all the reference pictures of the current picture are from one direction, the value of the threshold is set to $12 \times 2^{14-d}$; otherwise, it is set to $12 \times 2^{13-d}$.

Gradients for BIO are calculated at the same time with motion compensation interpolation using operations consistent with HEVC motion compensation process (two dimensional (2D) separable finite impulse response (FIR)). The input for this 2D separable FIR is the same reference frame sample as for motion compensation process and fractional position (fracX,fracY) according to the fractional part of block motion vector. In case of horizontal gradient $\partial I/\partial x$ signal first interpolated vertically using BIOfilterS corresponding to the fractional position fracY with de-scaling shift d−8, then gradient filter BIOfilterG is applied in horizontal direction corresponding to the fractional position fracX with de-scaling shift by 18−d. In case of vertical gradient $\partial I/\partial y$ first gradient filter is applied vertically using BIOfilterG corresponding to the fractional position fracY with de-scaling shift d−8, then signal displacement is performed using BIOfilterS in horizontal direction corresponding to the fractional position fracX with de-scaling shift by 18−d. The length of interpolation filter for gradients calculation BIOfilterG and signal displacement BIOfilterF is shorter (6-tap) in order to maintain reasonable complexity.

Table 1 shows the filters used for gradients calculation for different fractional positions of block motion vector in BIO. Table 2 shows the interpolation filters used for prediction signal generation in BIO.

TABLE 1

Filters for gradients calculation in BIO

| Fractional pel position | Interpolation filter for gradient(BIOfilterG) |
|---|---|
| 0 | {8, −39, −3, 46, −17, 5} |
| 1/16 | {8, −32, −13, 50, −18, 5} |
| 1/8 | {7, −27, −20, 54, −19, 5} |
| 3/16 | {6, −21, −29, 57, −18, 5} |
| 1/4 | {4, −17, −36, 60, −15, 4} |
| 5/16 | {3, −9, −44, 61, −15, 4} |
| 3/8 | {1, −4, −48, 61, −13, 3} |
| 7/16 | {0, 1, −54, 60, −9, 2} |
| 1/2 | {−1, 4, −57, 57, −4, 1} |

TABLE 2

Interpolation filters for prediction signal generation in BIO

| Fractional pel position | Interpolation filter for prediction signal(BIOfilterS) |
|---|---|
| 0 | {0, 0, 64, 0, 0, 0} |
| 1/16 | {1, −3, 64, 4, −2, 0} |
| 1/8 | {1, −6, 62, 9, −3, 1} |
| 3/16 | {2, −8, 60, 14, −5, 1} |
| 1/4 | {2, −9, 57, 19, −7, 2} |
| 5/16 | {3, −10, 53, 24, −8, 2} |
| 3/8 | {3, −11, 50, 29, −9, 2} |
| 7/16 | {3, −11, 44, 35, −10, 3} |
| 1/2 | {3, −10, 35, 44, −11, 3} |

In the JEM, BIO is applied to all bi-predicted blocks when the two predictions are from different reference pictures. When Local Illumination Compensation (LIC) is enabled for a CU, BIO is disabled.

In the JEM, overlapped block motion compensation (OBMC) is applied for a block after normal MC process. To reduce the computational complexity, BIO is not applied during the OBMC process. This means that BIO is only applied in the MC process for a block when using its own MV and is not applied in the MC process when the MV of a neighboring block is used during the OBMC process.

2.5 FRUC

A FRUC flag is signalled for a CU when its merge flag is true. When the FRUC flag is false, a merge index is signalled and the regular merge mode is used. When the FRUC flag is true, an additional FRUC mode flag is signalled to indicate which method (bilateral matching or template matching) is to be used to derive motion information for the block.

At encoder side, the decision on whether using FRUC merge mode for a CU is based on RD cost selection as done for normal merge candidate. That is the two matching modes (bilateral matching and template matching) are both checked for a CU by using RD cost selection. The one leading to the minimal cost is further compared to other CU modes. If a FRUC matching mode is the most efficient one, FRUC flag is set to true for the CU and the related matching mode is used.

Motion derivation process in FRUC merge mode has two steps. A CU-level motion search is first performed, then followed by a Sub-CU level motion refinement. At CU level, an initial motion vector is derived for the whole CU based on bilateral matching or template matching. First, a list of MV candidates is generated and the candidate which leads to the minimum matching cost is selected as the starting point for further CU level refinement. Then a local search based on bilateral matching or template matching around the starting point is performed and the MV results in the minimum matching cost is taken as the MV for the whole CU. Subsequently, the motion information is further refined at sub-CU level with the derived CU motion vectors as the starting points.

For example, the following derivation process is performed for a W×H CU motion information derivation. At the first stage, MV for the whole W×H CU is derived. At the second stage, the CU is further split into M×M sub-CUs. The value of M is calculated as in (16), D is a predefined splitting depth which is set to 3 by default in the JEM. Then the MV for each sub-CU is derived.

$$M = \max\left\{4, \min\left\{\frac{M}{2^D}, \frac{N}{2^D}\right\}\right\} \tag{13}$$

Figure 10:
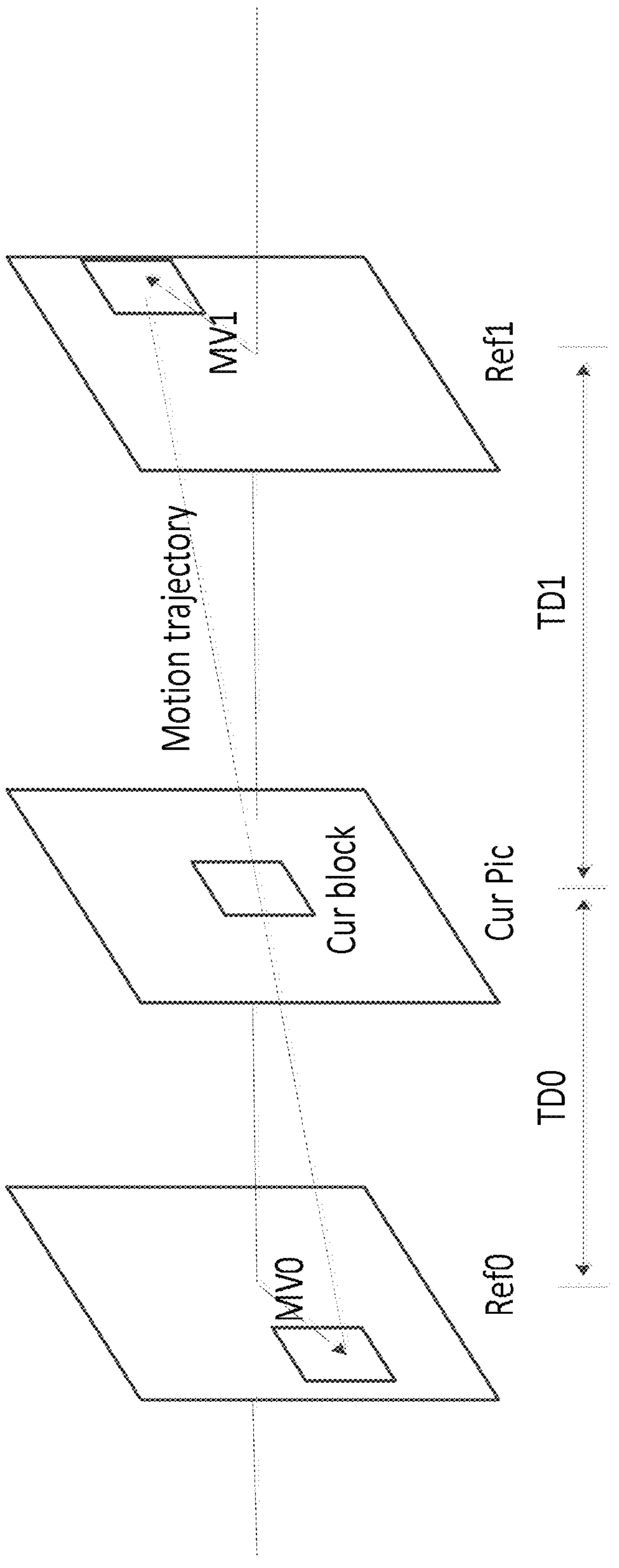
FIG. 10 shows an example of bilateral matching.

As shown in the FIG. 10, the bilateral matching is used to derive motion information of the current CU by finding the closest match between two blocks along the motion trajectory of the current CU in two different reference pictures. Under the assumption of continuous motion trajectory, the motion vectors MV0 and MV1 pointing to the two reference blocks shall be proportional to the temporal distances, i.e., TD0 and TD1, between the current picture and the two reference pictures. As a special case, when the current picture is temporally between the two reference pictures and the temporal distance from the current picture to the two reference pictures is the same, the bilateral matching becomes minor based bi-directional MV.

Figure 11:
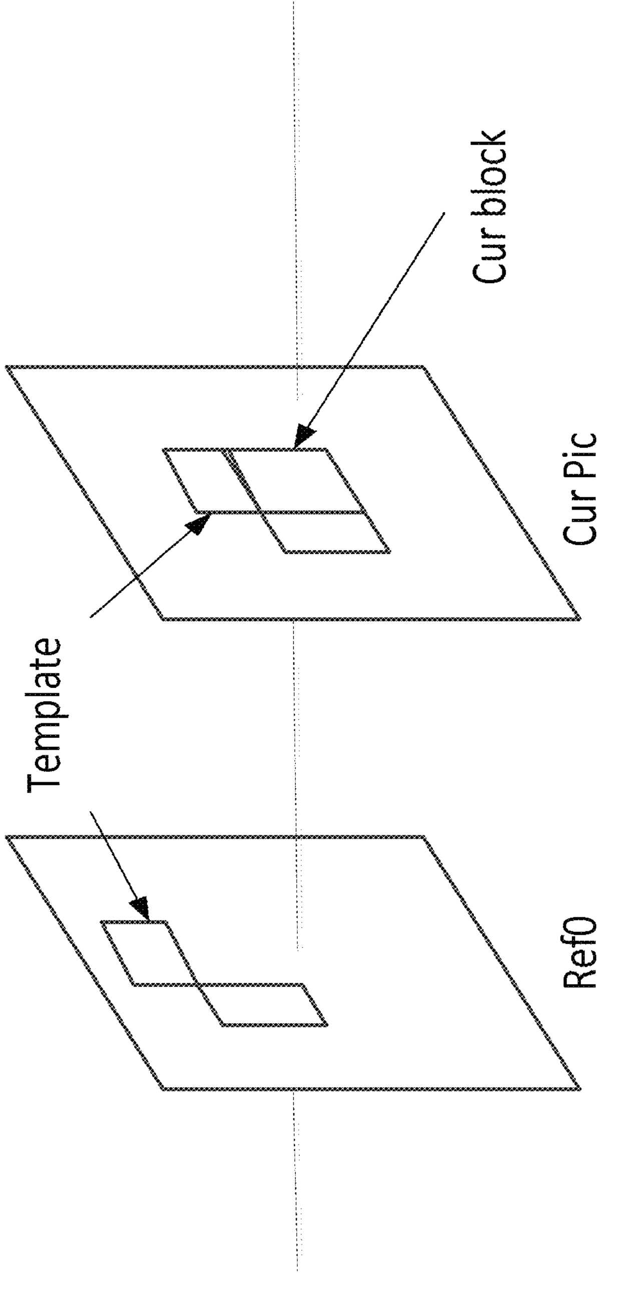
FIG. 11 shows an example of template matching.

As shown in FIG. 11, template matching is used to derive motion information of the current CU by finding the closest match between a template (top and/or left neighbouring blocks of the current CU) in the current picture and a block (same size to the template) in a reference picture. Except the aforementioned FRUC merge mode, the template matching is also applied to AMVP mode. In the JEM, as done in HEVC, AMVP has two candidates. With template matching method, a new candidate is derived. If the newly derived candidate by template matching is different to the first existing AMVP candidate, it is inserted at the very beginning of the AMVP candidate list and then the list size is set to two (meaning remove the second existing AMVP candidate). When applied to AMVP mode, only CU level search is applied.

CU Level MV Candidate Set

The MV candidate set at CU level consists of:

(i) Original AMVP candidates if the current CU is in AMVP mode (ii) all merge candidates, (iii) several MVs in the interpolated MV field (described later).

(iv) top and left neighbouring motion vectors

When using bilateral matching, each valid MV of a merge candidate is used as an input to generate a MV pair with the assumption of bilateral matching. For example, one valid MV of a merge candidate is (MVa, refa) at reference list A. Then the reference picture refb of its paired bilateral MV is found in the other reference list B so that refa and refb are temporally at different sides of the current picture. If such a refb is not available in reference list B, refb is determined as a reference which is different from refa and its temporal distance to the current picture is the minimal one in list B. After refb is determined, MVb is derived by scaling MVa based on the temporal distance between the current picture and refa, refb.

Four MVs from the interpolated MV field are also added to the CU level candidate list. More specifically, the interpolated MVs at the position (0, 0), (W/2, 0), (0, H/2) and (W/2, H/2) of the current CU are added.

When FRUC is applied in AMVP mode, the original AMVP candidates are also added to CU level MV candidate set.

At the CU level, up to 15 MVs for AMVP CUs and up to 13 MVs for merge CUs are added to the candidate list.

Sub-CU Level MV Candidate Set

The MV candidate set at sub-CU level consists of:

(i) an MV determined from a CU-level search, (ii) top, left, top-left and top-right neighbouring MVs, (iii) scaled versions of collocated MVs from reference pictures, (iv) up to 4 ATMVP candidates, (v) up to 4 STMVP candidates The scaled MVs from reference pictures are derived as follows. All the reference pictures in both lists are traversed. The MVs at a collocated position of the sub-CU in a reference picture are scaled to the reference of the starting CU-level MV.

ATMVP and STMVP candidates are limited to the four first ones.

At the sub-CU level, up to 17 MVs are added to the candidate list.

Generation of Interpolated MV Field

Before coding a frame, interpolated motion field is generated for the whole picture based on unilateral ME. Then the motion field may be used later as CU level or sub-CU level MV candidates.

Figure 12:
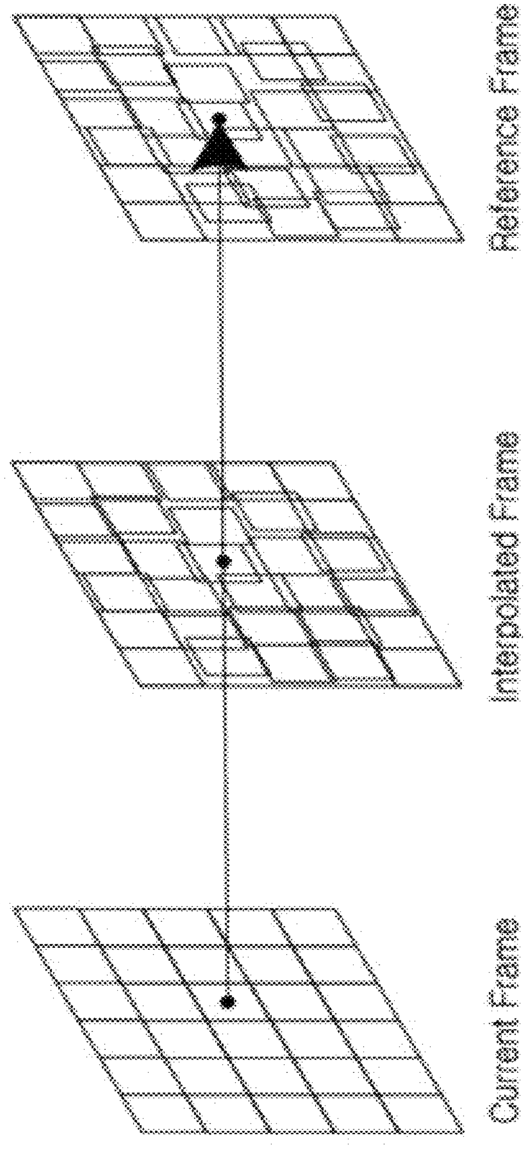
FIG. 12 shows an example of unilateral motion estimation (ME) in frame rate up-conversion (FRUC).

First, the motion field of each reference pictures in both reference lists is traversed at 4×4 block level. For each 4×4 block, if the motion associated to the block passing through a 4×4 block in the current picture (as shown in FIG. 12) and the block has not been assigned any interpolated motion, the motion of the reference block is scaled to the current picture according to the temporal distance TD0 and TD1 (the same way as that of MV scaling of TMVP in HEVC) and the scaled motion is assigned to the block in the current frame. If no scaled MV is assigned to a 4×4 block, the block's motion is marked as unavailable in the interpolated motion field.

Interpolation and Matching Cost

When a motion vector points to a fractional sample position, motion compensated interpolation is needed. To reduce complexity, bi-linear interpolation instead of regular 8-tap HEVC interpolation is used for both bilateral matching and template matching.

The calculation of matching cost is a bit different at different steps. When selecting the candidate from the candidate set at the CU level, the matching cost is the absolute sum difference (SAD) of bilateral matching or template matching. After the starting MV is determined, the matching cost C of bilateral matching at sub-CU level search is calculated as follows:

$$C = SAD + w \cdot (|MV_x - MV_x^s| + |MV_y - MV_y^s|) \quad (14)$$

where w is a weighting factor which is empirically set to 4, MV and $MV^s$ indicate the current MV and the starting MV, respectively. SAD is still used as the matching cost of template matching at sub-CU level search.

In FRUC mode, MV is derived by using luma samples only. The derived motion will be used for both luma and chroma for MC inter prediction. After MV is decided, final MC is performed using 8-taps interpolation filter for luma and 4-taps interpolation filter for chroma.

MV Refinement

MV refinement is a pattern based MV search with the criterion of bilateral matching cost or template matching cost. In the JEM, two search patterns are supported—an unrestricted center-biased diamond search (UCBDS) and an adaptive cross search for MV refinement at the CU level and sub-CU level, respectively. For both CU and sub-CU level MV refinement, the MV is directly searched at quarter luma sample MV accuracy, and this is followed by one-eighth luma sample MV refinement. The search range of MV refinement for the CU and sub-CU step are set equal to 8 luma samples.

Selection of Prediction Direction in Template Matching FRUC Merge Mode

In the bilateral matching merge mode, bi-prediction is always applied since the motion information of a CU is derived based on the closest match between two blocks along the motion trajectory of the current CU in two different reference pictures. There is no such limitation for the template matching merge mode. In the template matching merge mode, the encoder can choose among uni-prediction from list0, uni-prediction from list1 or bi-prediction for a CU. The selection is based on a template matching cost as follows:

```
If costBi <= factor * min (cost0, cost1)
  bi-prediction is used;
Otherwise, if cost0 <= cost1
  uni-prediction from list0 is used;
Otherwise,
  uni-prediction from list1 is used;
```

where cost0 is the SAD of list0 template matching, cost1 is the SAD of list1 template matching and costBi is the SAD of bi-prediction template matching. The value of factor is equal to 1.25, which means that the selection process is biased toward bi-prediction.

The inter prediction direction selection is only applied to the CU-level template matching process.

Interweaved Prediction Examples

With interweaved prediction, a block is divided into sub-blocks with more than one dividing patterns. A dividing pattern is defined as the way to divide a block into sub-blocks, including the size of sub-blocks and the position of sub-blocks. For each dividing pattern, a corresponding prediction block may be generated by deriving motion information of each sub-block based on the dividing pattern. Therefore, even for one prediction direction, multiple prediction blocks may be generated by multiple dividing patterns. Alternatively, for each prediction direction, only a dividing pattern may be applied.

Figure 13:
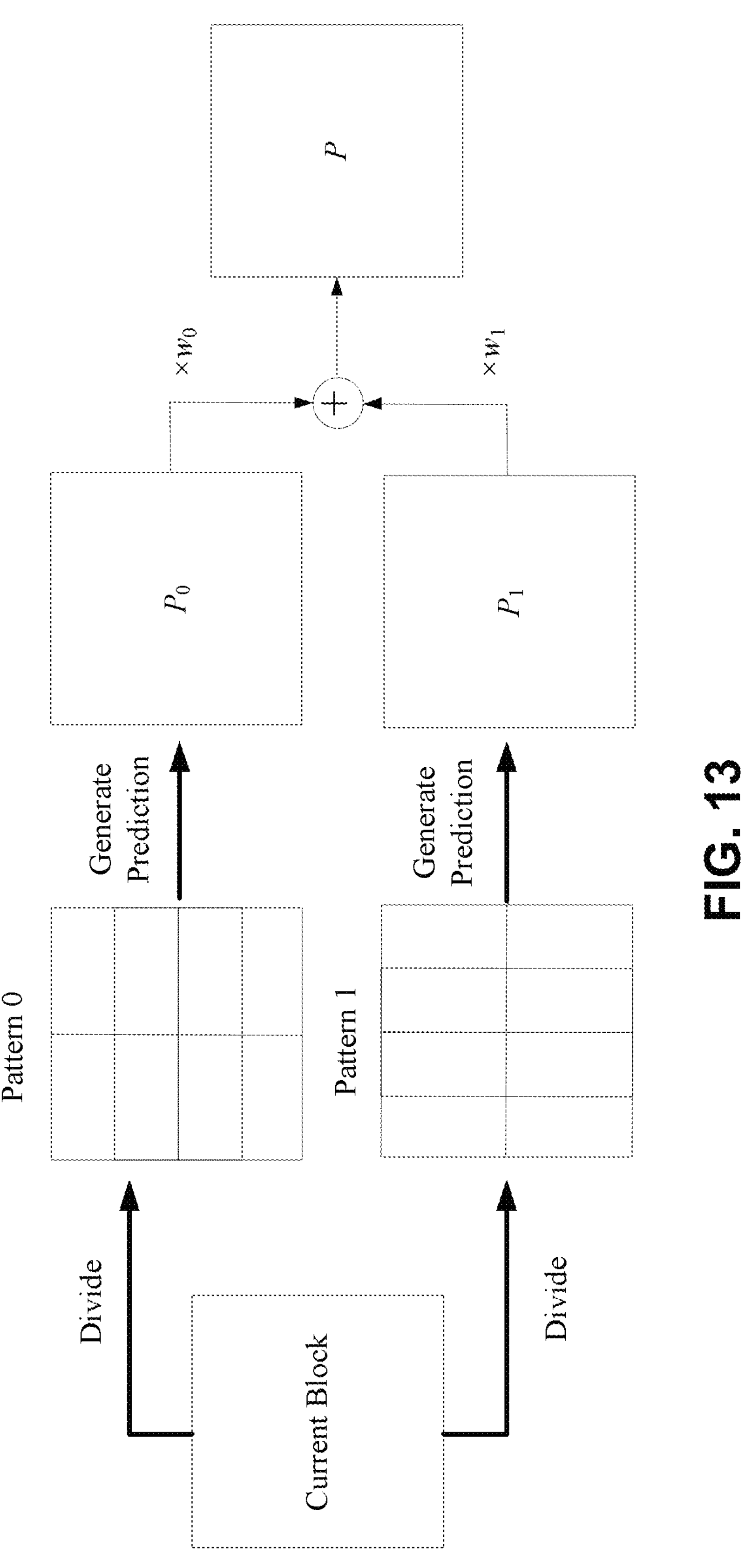
FIG. 13 illustrate an example implementation of interweaved prediction.

Suppose there are X dividing patterns, and X prediction blocks of the current block, denoted as $P_0, P_1, \ldots, P_{X-1}$ are generated by sub-block based prediction with the X dividing patterns. The final prediction of the current block, denoted as P, can be generated as:

$$P(x, y) = \frac{\sum_{i=0}^{X-1} w_i(x, y) \times P_i(x, y)}{\sum_{i=0}^{X-1} w_i(x, y)} \quad (15)$$

where (x, y) is the coordinate of a pixel in the block and $w_i(x, y)$ is the weighting value of $P_i$. Without losing generalization, it is supposed that $$\sum_{i=0}^{X-1} w_i(x, y) = (1 \ll N)$$

wherein N is a non-negative value. FIG. 13 shows an example of interweaved prediction with two dividing patterns.

3. Example Problems Solved by the Described Embodiments

There are two potential drawbacks of the affine merge MV derivation process as shown in FIG. 5.

First, the coordinate of the left-top point of a CU and the size of the CU must be stored by each 4×4 block belonging to the CU. This information is not required to be stored in HEVC Second, the decoder must access MVs of 4×4 blocks not adjacent to the current CU. In HEVC, the decoder only needs to access MVs of 4×4 blocks adjacent to the current CU.

4. Examples of Embodiments

We propose several methods to further improve sub-block based prediction, including the interweaved prediction and the affine merge MV derivation process.

The listing of techniques and embodiments below should be considered as examples to explain general concepts. Furthermore, these techniques can be combined to operate together during video encoding, or correspondingly during decoding, process. Note that here the term "encoding" includes "transcoding" in which source video in a non-compressed format is encoded into another coded format.

MV Derivation of Sub-Blocks

Figure 14:
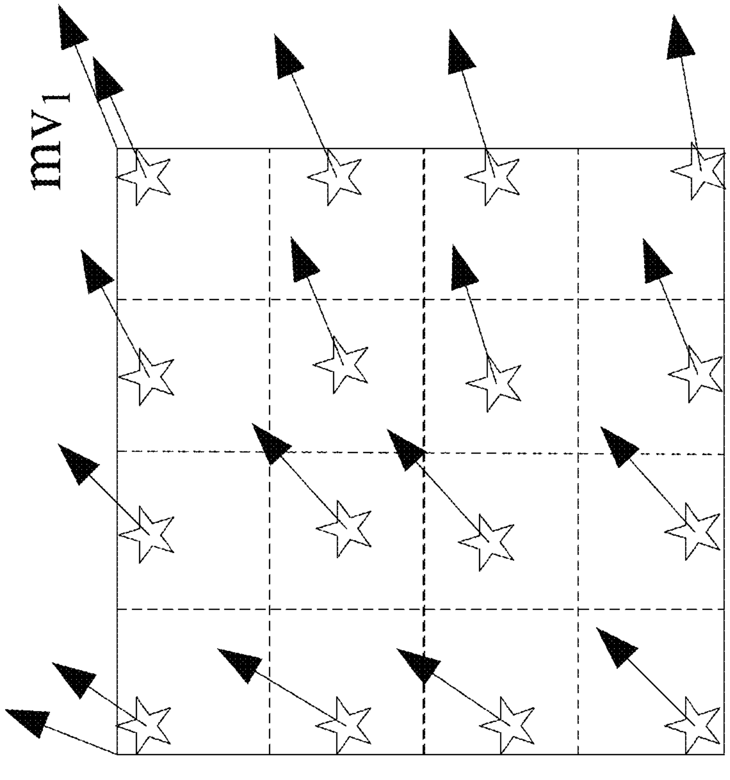
FIG. 14 shows an example of different positions to derive motion vectors (MVs) for different sub-blocks, where stars represent the different positions.

1. In one embodiment, the MV for a sub-block is derived for the center of the sub-block.
   a. Alternatively, the MV for a sub-block is derived for any position inside the sub-block, which may not be at the center of the sub-block.
   b. Alternatively, the position for which MV is derived may be different for each sub-block. (The position is relative to each sub-block)
   c. the position for which MV is derived may depend on the location of the sub-block. FIG. 14 shows an example.
   d. Denote the sub-block size by M×N, wherein the center position could be defined as ((M>>1)+a)×((N>>1)+b) wherein a, b could be 0 or −1.

FIG. 14 shows an example of different positions to derive MVs for different sub-blocks. Stars represent the positions. As can be seen, various different positions may be used for MV derivation.

Efficient Affine Merge MV Derivation

Figure 15:
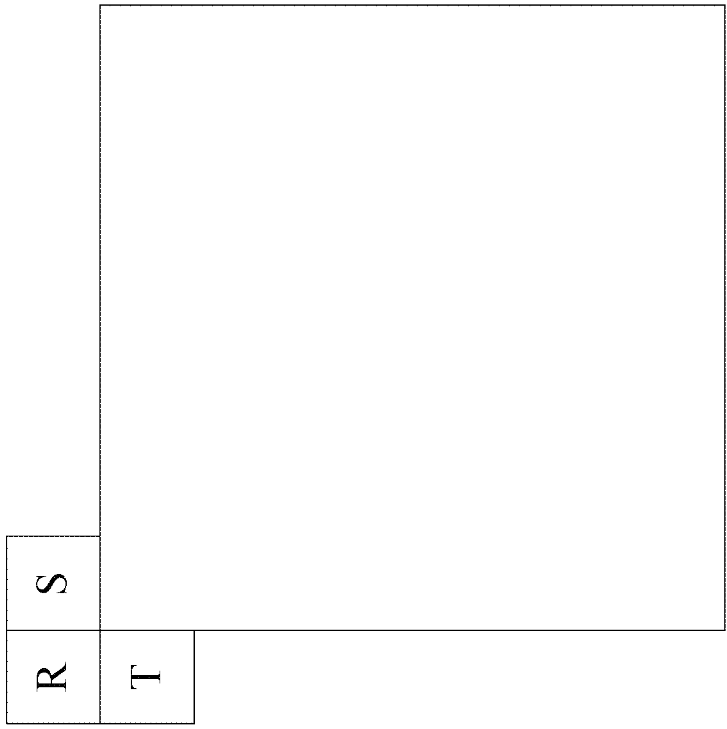
FIG. 15 shows examples of neighboring blocks to derive $v_{0x}$ and $v_{0y}$.
Figure 16B:
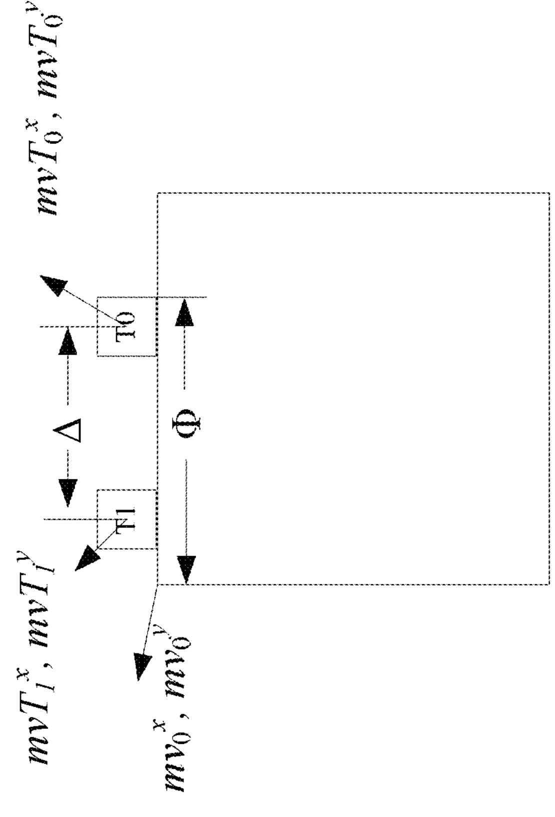
FIG. 16A and FIG. 16B show examples of how to derive MVs for the affine merge mode from left adjacent blocks coded with the affine mode or from top adjacent blocks coded with the affine mode.
Figure 16A:
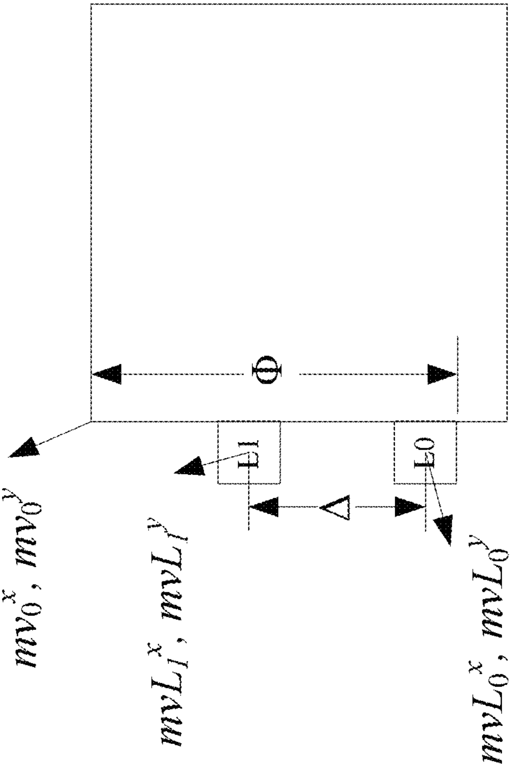

1. In one embodiment, the MVs at control points (such as mv0 at the top-left point and mvl at the top-right point) are derived only with the information of the adjacent neighbouring blocks, in the affine merge MV derivation process. In one example, the coordinate of the left-top point and the size of a neighbouring CU, and MVs of 4×4 blocks not adjacent to the current CU are not needed to derive the MVs of the current CU with the affine merge mode.
   a. In one embodiment, the affine parameters (such as a, b, c and d for the four-parameter affine mode in eq (1)) are stored in each block coded with the affine mode (including affine inter-mode and affine merge mode).
      i. If a block is coded with the affine merge mode, it inherits the four parameters from a neighbouring block coded with the affine mode.
      ii. In one example, the four parameters are different for list 0 and list1.
      iii. In one examples, parameters for both reference picture lists may be stored. Alternatively, only a set of affine parameters may be stored even for bi-prediction. Alternatively, for multiple hypothesis, 2 sets of affine parameters may be stored and each one corresponds to one reference picture list for bi-prediction.
   b. In one embodiment, only partial of a set of affine parameters (e.g., the two parameters (a and b) in eq (1) for the four-parameter affine) are stored in each block coded with the affine mode (including affine inter-mode and affine merge mode). If a block is coded with the affine merge mode, it inherits the stored partial parameters from a neighbouring block coded with the affine mode.
      i. In one example, different reference pictures or different reference picture lists may store all the related partial affine parameters.
      ii. The two parameters are different for list 0 and list1.
   c. In one embodiment, $v_{0x}$ and $v_{0y}$ (also denoted as c and d) in eq (1) are derived from blocks adjacent to the to the top-left corner of the current block. In the following examples, it is supposed the current block is merged to neighbouring block G coded with affine mode.
      i. In one example, three neighbouring blocks R, S and T as shown in FIG. 15 are used to derive ($v_{0x}$, $v_{0y}$). MVs in the three blocks are noted as MV(R), MV(S) and MV(T).
         (a) In one example, ($v_{0x}$, $v_{0y}$) is set equal to MV(X) (X can be R, S or T), if X is inter-coded.
         (b) In one example, ($v_{0x}$, $v_{0y}$) is set equal to the average of MV(R), MV(S) and MV(T), if R, S and T are inter-coded.
         (c) In one example, ($v_{0x}$, $v_{0y}$) is set equal to the average of MV(X) and MV(Y) (X and Y can be R, S or T), if X and Y are inter-coded.
         (d) In one example, ($v_{0x}$, $v_{0y}$) is set equal to MV(X) and MV(X) should refer to the same reference of block G.
      ii. In one example, ($v_{0x}$, $v_{0y}$) is derived from the MV of temporal neighbouring blocks.
      iii. In one example, ($v_{0x}$, $v_{0y}$) is scaled to the reference of block G.
   d. In one embodiment, the MVs of a block coded with the affine merge mode are derived from S (S=2 for four-parameter affine mode, 3 for six-parameter affine mode) left adjacent blocks coded with the affine mode. FIG. 18A shows an example. L0 and L1 are two left adjacent blocks coded with the affine mode. Δ is the distance between the two left adjacent blocks. The motion vectors of the two blocks are $(mvL_0^x, mvL_0^y)$ and $(mvL_1^x, mvL_1y)$, respectively. $(mv_0^x, mv_0^y)$ is the MV at the top-left control point of the current block (a. k. a. $(v_{0x}, v_{0y})$ in eq (1). The y-distance between one of the two blocks (for example L0) and the top-left control point is noted as Φ. It should be noted that the distance can be measured from the top, the middle or the bottom of the block. In FIG. 16A, it is measured from the bottom.

i. In one example, a and b in eq. (1) can be derived as:

$$a = (mvL_1^y - mvL_0^y)/\Delta,\ b = -(mvL_1^x - mvL_0^x)/\Delta.$$

ii. Δ can be a fixed number.

(a) It can be in a form of $2^N$, such as 1, 4, 8, 16 etc. In this case, the division operation to calculate a and b above can be implemented as a shift operation.

iii. Δ can be a number depending on the height of the block.

iv. Δ can be derived as the maximum length satisfying that all left adjacent blocks between L0 and L1 (both included) are coded with the affine mode and share the same reference picture.

v.

$$(mv_0^x, mv_0^y)$$

can be derived as:

$$mv_0^x = mvL_0^x + b\Phi,\ mv_0^y = mvL_0^y - a\Phi.$$

vi. If Φ is the y-distance between L1 and the top-left control point, when $$(mv_0^x, mv_0^y)$$

can be derived as:

$$mv_0^x = mvL_1^x + b\Phi,\ mv_0^y = mvL_1^y - a\Phi.$$

e. In one embodiment, the MVs of a block coded with the affine merge mode are derived from S (S=2 for four-parameter affine mode, 3 for six-parameter affine mode) top adjacent blocks coded with the affine mode. FIG. 16B shows an example. T0 and T1 are two top adjacent blocks coded with the affine mode. Δ is the distance between the two top adjacent blocks. The motion vectors of the two blocks are $$(mvT_0^x, mvT_0^y) \text{ and } (mvT_1^x, mvT_1^y),$$

respectively.

$$(mv_0^x, mv_0^y)$$

is the MV at the top-left control point of the current block (a.k.a., $(v_{0x}, v_{0y})$ in eq (1). The x-distance between one of the two blocks (for example T0) and the top-left control point is noted as Φ. It should be noted that the distance can be measured from the left, the middle or the right of the block. In FIG. 16B, it is measured from the right.

i. In one example, a and b in eq. (1) can be derived as:

$$a = (mvT_1^x - mvT_0^x)/\Delta,\ b = -(mvT_1^y - mvT_0^y)/\Delta.$$

ii. Δ can be a fixed number.

(a) It can be in a form of $2^N$, such as 1, 4, 8, 16 etc. In this case, the division operation to calculate a and b above can be implemented as a shift operation.

iii. Δ can be a number depending on the height of the block.

iv. Δ can be derived as the maximum length satisfying that all top adjacent blocks between T0 and T1 (both included) are coded with the affine mode and share the same reference picture.

v.

$$(mv_0^x, mv_0^y)$$

can be derived as $$mv_0^x = mvT_0^x - a\Phi,\ mv_0^y = mvT_0^y - b\Phi.$$

vi. If Φ is the x-distance between T1 and the top-left control point, then $$(mv_0^x, mv_0^y)$$

can be derived as:

$$mv_0^x = mvT_1^x - a\Phi,\ mv_0^y = mvT_1^y - b\Phi.$$

FIGS. 16A and 16B show examples of derive MVs for the affine merge mode from left adjacent blocks coded with the affine mode (FIG. 16A) or from top adjacent blocks coded with the affine mode (FIG. 16B).

f. MVs of a block coded with affine merge mode may be derived from non-adjacent blocks coded with affine mode.

g. Which adjacent blocks are used to derive MVs of a block coded with the affine merge mode may depend on the block shape.

i. For a block with size M×N and M>N, the MVs of a block coded with the affine merge mode are derived from top adjacent blocks coded with the affine mode.

ii. For a block with size M×N and M<N, the MVs of a block coded with the affine merge mode are derived from left adjacent blocks coded with the affine mode.

iii. For a block with size M×N and M=N, the MVs of a block coded with the affine merge mode are derived from blocks adjacent to the to the top-left corner of the current block.

Figure 17:
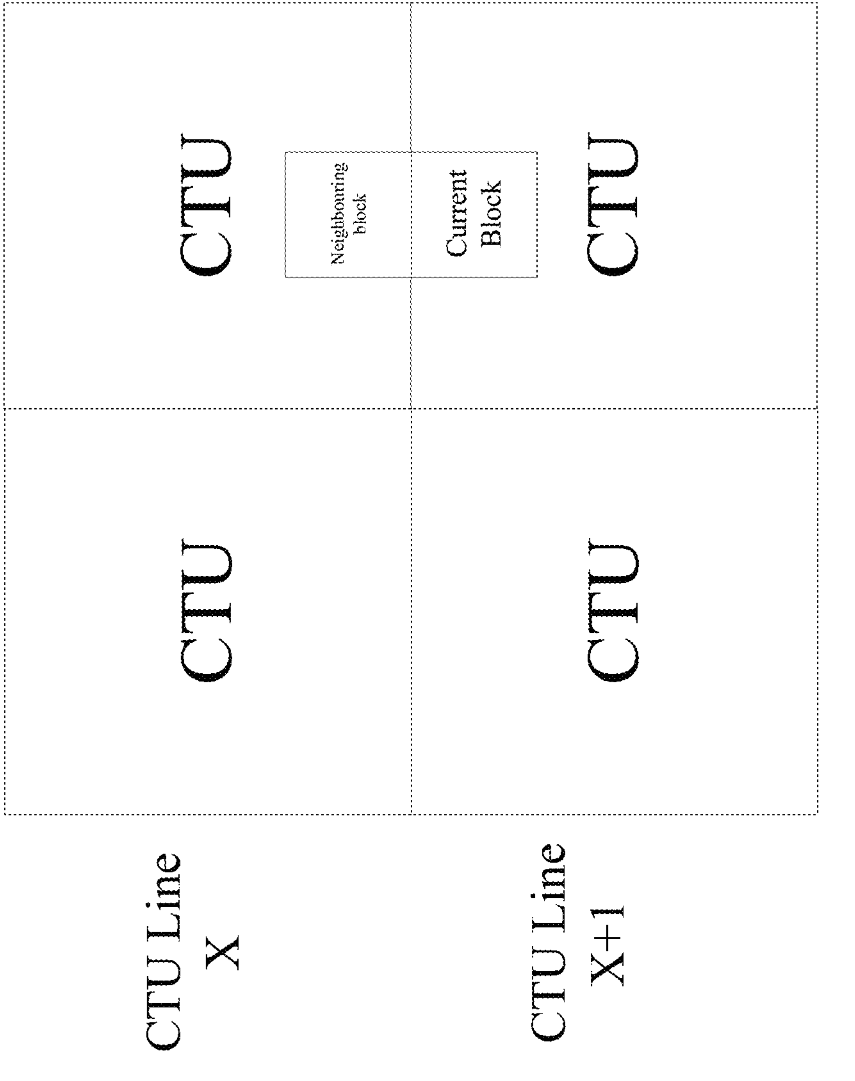
FIG. 17 shows an example of a neighboring block and a current block belonging to different coding tree unit (CTU) lines, in which an affine merge candidate from such a neighboring block is treated as invalid.

3. In one embodiment, whether an affine merge candidate from a neighboring block is a valid affine merge candidate depends on the location of the neighboring block.
   a. In one example, an affine merge candidate from a neighboring block is treated as invalid (not be put into the merge candidate list) if the neighboring block belongs to a Coding Tree Unit (CTU) (e.g., a largest CU (LCU)) different from the current CTU.
   b. Alternatively, an affine merge candidate from a neighboring block is treated as invalid (not be put into the merge candidate list) if the neighboring block belongs to a CTU line different from the current CTU line, as shown in FIG. 17.
   c. Alternatively, an affine merge candidate from a neighbouring block is treated as invalid (not be put into the merge candidate list) if the neighbouring block belongs to a slice different from the slice.
   d. Alternatively, an affine merge candidate from a neighbouring block is treated as invalid (not be put into the merge candidate list) if the neighbouring block belongs to a tile different from the tile.

FIG. 17 shows an example of a neighboring block and a current block belonging to different CTU lines. In this example, an affine merge candidate from a neighboring block is treated as invalid (not be put into the merge candidate list) if the neighboring block belongs to a CTU line different from the current CTU line.

Examples of Interweaved Prediction

Figure 18:
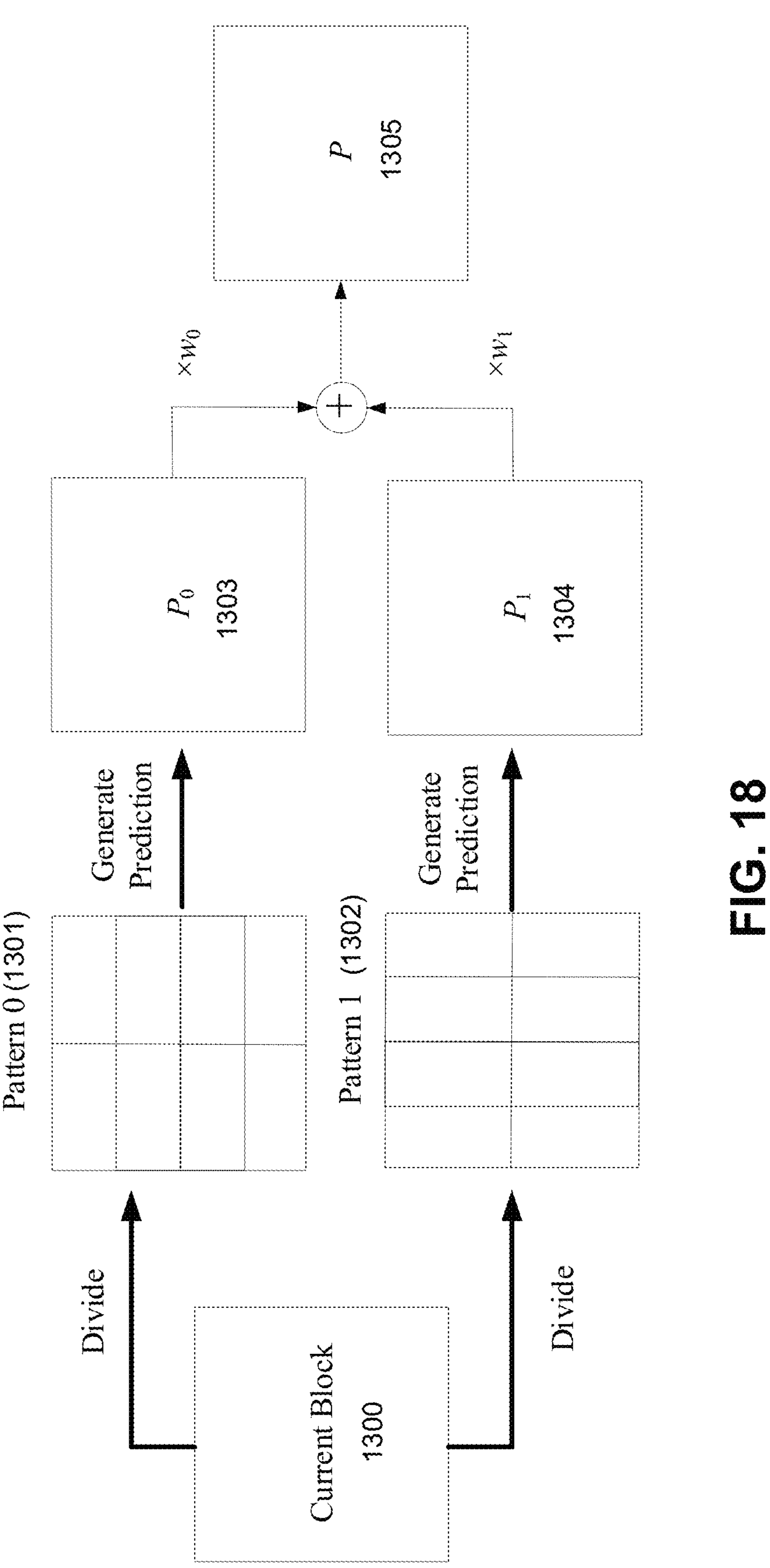
FIG. 18 shows an example of interweaved prediction with two dividing patterns in accordance with the disclosed embodiments.

FIG. 18 shows an example of interweaved prediction with two dividing patterns in accordance with the disclosed embodiments. A current block 1300 can be divided into multiple patterns. For example, as shown in FIG. 18, the current block is divided into both Pattern 0 (1301) and Pattern 1 (1302). Two prediction blocks, $P_0$ (1303) and $P_1$ (1304), are generated. A final prediction block P (1305) of the current block 1300 can be generated by computing a weighted sum of $P_0$ (1303) and $P_1$ (1304).

More generally, given X dividing patterns, X prediction blocks of the current block, denoted as $P_0, P_1, \ldots, P_{X-1}$, can be generated by sub-block based prediction with the X dividing patterns. The final prediction of the current block, denoted as P, can be generated as:

$$P(x, y) = \frac{\sum_{i=0}^{X-1} w_i(x, y) \times P_i(x, y)}{\sum_{i=0}^{X-1} w_i(x, y)} \quad \text{Eq. (15)}$$

Here, (x, y) is the coordinate of a pixel in the block and $w_i(x, y)$ is the weighting value of $P_i$. By the way of example, and not by limitation, the weights can be expressed as:

$$\sum_{i=0}^{X-1} w_i(x, y) = (1 \ll N) \quad \text{Eq. (16)}$$

N is a non-negative value. Alternatively, the bit-shifting operation in Eq. (16) can also be expressed as:

$$\sum_{i=0}^{X-1} w_i(x, y) = 2^N \quad \text{Eq. (17)}$$

The sum of the weights being a power of two allows a more efficient computation of the weighted sum P by performing a bit-shifting operation instead of a floating-point division.

Figure 19B:
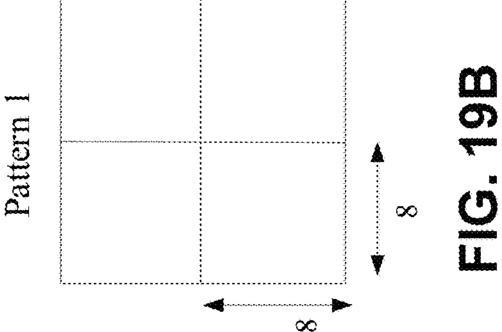
FIG. 19B shows an example dividing pattern in which a block is divided into 8×8 sub-blocks in accordance with the disclosed embodiments.
Figure 19C:
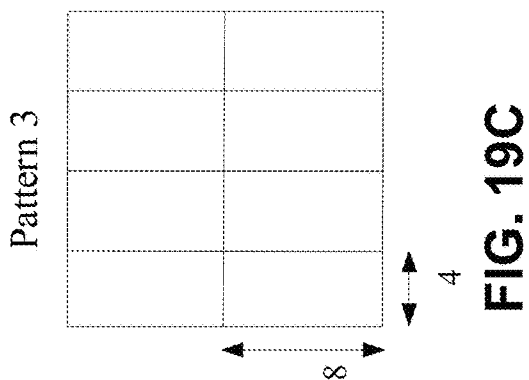
FIG. 19C shows an example dividing pattern in which a block is divided into 4×8 sub-blocks in accordance with the disclosed embodiments.
Figure 19A:
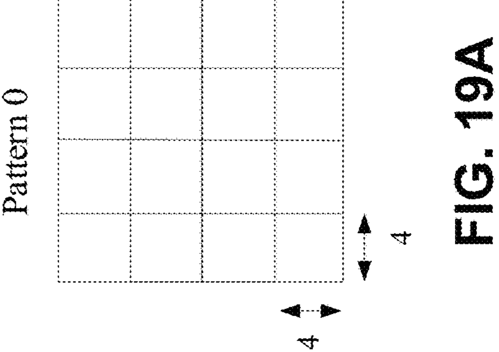
FIG. 19A shows an example dividing pattern in which block is divided into 4×4 sub-blocks in accordance with the disclosed embodiments.
Figure 19D:
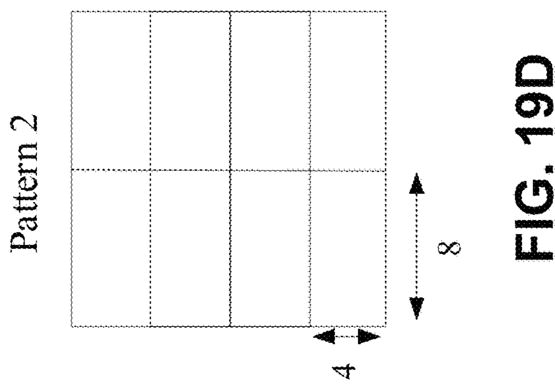
FIG. 19D shows an example dividing pattern in which a block is divided into 8×4 sub-blocks in accordance with the disclosed embodiments.
Figures 19E, 19F, 19G:
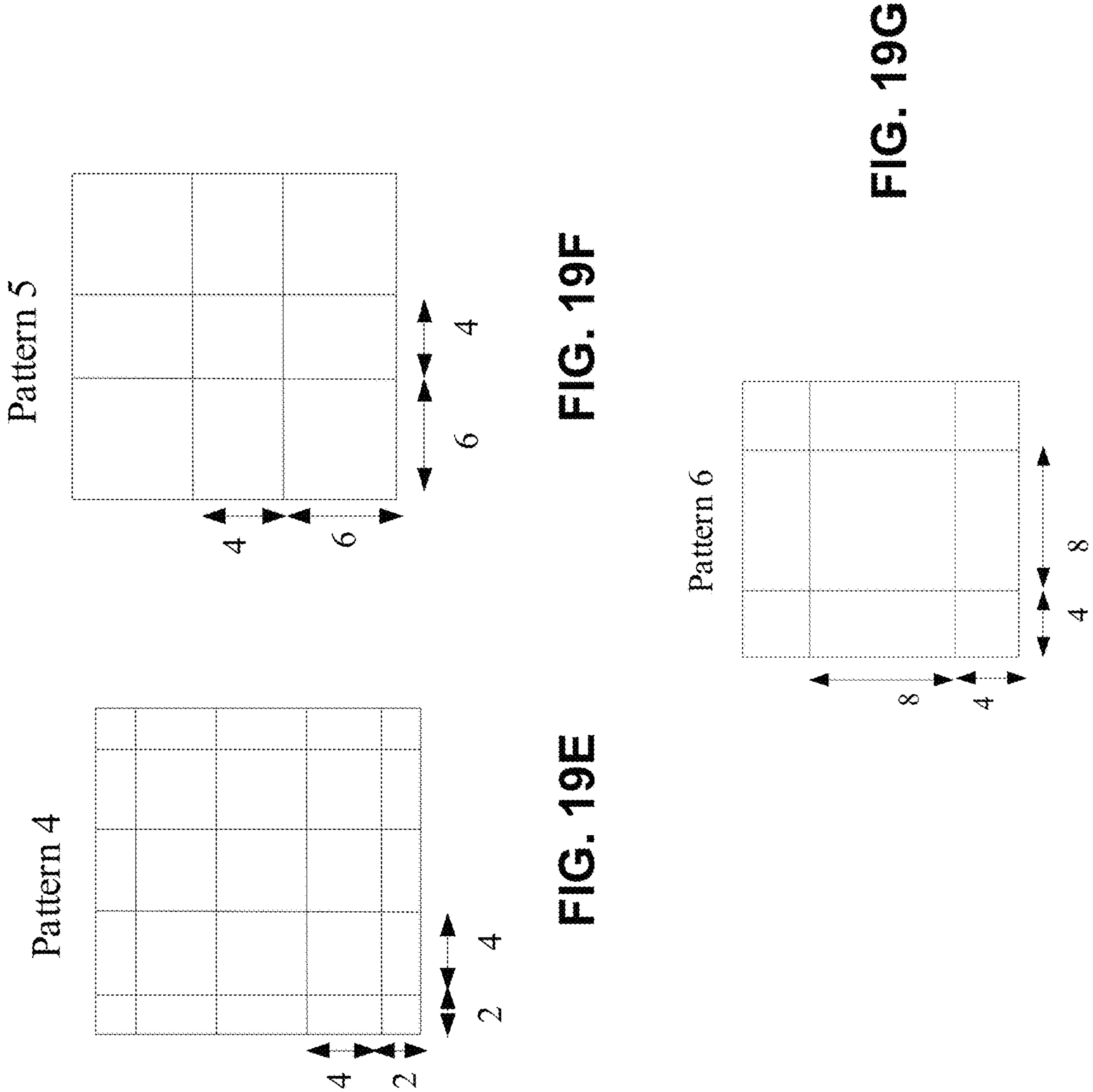
FIG. 19E shows an example dividing pattern in which a block is divided into non-uniform sub-blocks in accordance with the disclosed embodiments.
FIG. 19F shows another example dividing pattern in which a block is divided into non-uniform sub-blocks in accordance with the disclosed embodiments.
FIG. 19G shows yet another example dividing pattern in which a block is divided into non-uniform sub-blocks in accordance with the disclosed embodiments.

Dividing patterns can have different shapes, or sizes, or positions of sub-blocks. In some embodiments, a dividing pattern may include irregular sub-block sizes. FIGS. 19A-G show several examples of dividing patterns for a 16×16 block. In FIG. 19A, a block is divided into 4×4 sub-blocks in accordance with the disclosed embodiments. This pattern is also used in JEM. FIG. 19B shows an example of a block being divided into 8×8 sub-blocks in accordance with the disclosed embodiments. FIG. 19C shows an example of the block being divided into 8×4 sub-blocks in accordance with the disclosed embodiments. FIG. 19D shows an example of the block being divided into 4×8 sub-blocks in accordance with the disclosed embodiments. In FIG. 19E, a portion of the block is divided into 4×4 sub-blocks in accordance with the disclosed embodiments. The pixels at block boundaries are divided in smaller sub-blocks with sizes like 2×4, 4×2 or 2×2. Some sub-blocks may be merged to form larger sub-blocks. FIG. 19F shows an example of adjacent sub-blocks, such as 4×4 sub-blocks and 2×4 sub-blocks, that are merged to form larger sub-blocks with sizes like 6×4, 4×6 or 6×6. In FIG. 19G, a portion of the block is divided into 8×8 sub-blocks. The pixels at block boundaries are divided in smaller sub-blocks with sizes like 8×4, 4×8 or 4×4 instead.

The shapes and sizes of sub-blocks in sub-block based prediction can be determined based on the shape and/or size of the coding block and/or coded block information. For example, in some embodiments, the sub-blocks have a size of 4×N (or 8×N, etc.) when the current block has a size of M×N. That is, the sub-blocks have the same height as the current block. In some embodiments, the sub-blocks have a size of M×4 (or M×8, etc.) when the current block has a size of M×N. That is, the sub-blocks have the same width as the current block. In some embodiments, the sub-blocks have a size of A×B with A>B (e.g., 8×4) when the current block has a size of M×N, where M>N. Alternatively, the sub-blocks can have the size of B×A (e.g., 4×8).

In some embodiments, the current block has a size of M×N. The sub-blocks have a size of A×B when M×N<=T (or Min(M, N)<=T, or Max(M, N)<=T, etc.), and the sub-blocks have a size of C×D when M×N>T (or Min(M, N)>T, or Max(M, N)>T, etc.), where A<=C and B<=D. For example, if M×N<=256, sub-blocks can be in a size of 4×4. In some implementations, the sub-blocks have a size of 8×8.

In some embodiments, whether to apply interweaved prediction can be determined based on the inter-prediction direction. For example, in some embodiments, the interweaved prediction may be applied for bi-prediction but not for uni-prediction. As another example, when multiple-hypothesis is applied, the interweaved prediction may be applied for one prediction direction when there are more than one reference blocks.

In some embodiments, how to apply interweaved prediction may also be determined based on the inter-prediction direction. In some embodiments, a bi-predicted block with sub-block based prediction is divided into sub-blocks with two different dividing patterns for two different reference lists. For example, a bi-predicted block is divided into 4×8 sub-blocks as shown in FIG. 19D when predicted from reference list0 (L0). The same block is divided into 8×4 sub-blocks as shown in FIG. 19C when predicted from reference list1 (L1). The final prediction P is calculated as:

$$P(x, y) = \frac{w^0(x, y) \times P^0(x, y) + w^1(x, y) \times P^1(x, y)}{w^0(x, y) + w^1(x, y)} \quad \text{Eq. (18)}$$

Here, $P^0$ and $P^1$ are predictions from L0 and L1, respectively. $w^0$ and $w^1$ are weighting values for L0 and L1, respectively. As shown in Eq. (16), the weighting values can be determined as: $w^0(x, y)+w^1(x, y)=1<<N$ (wherein N is non-negative integer value). Because fewer sub-blocks are used for prediction in each direction (e.g., 4×8 sub-blocks as opposed to 8×8 sub-blocks), the computation requires less bandwidth as compared to the existing sub-block based methods. By using larger sub-blocks, the prediction results are also less susceptible to noise interference.

In some embodiments, a uni-predicted block with sub-block based prediction is divided into sub-blocks with two or more different dividing patterns for the same reference list. For example, the prediction for list L (L=0 or 1) $P^L$ is calculated as:

$$P^L(x, y) = \frac{\sum_{i=0}^{XL-1} w_i^L(x, y) \times P_i^L(x, y)}{\sum_{i=0}^{XL-1} w_i^L(x, y)} \quad \text{Eq. (19)}$$

Here XL is the number of dividing patterns for list L. $P_i^L(x, y)$ is the prediction generated with the $i^{th}$ dividing pattern and $w_i^L(x, y)$ is the weighting value of $P_i^L((x, y)$. For example, when XL is 2, two dividing patterns are applied for list L. In the first dividing pattern, the block is divided into 4×8 sub-blocks as shown in FIG. 19D. In the second dividing pattern, the block is divided into 8×4 sub-blocks as shown in FIG. 19D.

In some embodiments, a bi-predicted block with sub-block based prediction is considered as a combination of two uni-predicted block from L0 and L1 respectively. The prediction from each list can be derived as described in the above example. The final prediction P can be calculated as:

$$P(x, y) = \frac{a * \frac{\sum_{i=0}^{XL0-1} w_i^0(x, y) \times P_i^0(x, y)}{\sum_{i=0}^{XL0-1} w_i^0(x, y)} + b * \frac{\sum_{i=0}^{XL1-1} w_i^1(x, y) \times P_i^1(x, y)}{\sum_{i=0}^{XL1-1} w_i^1(x, y)}}{a + b} \quad \text{Eq. (20)}$$

Here paramters a and b are two additional weights applied to the two internal prediction blocks. In this specific exmaple, both a and b can be set to 1. Similar to the example above, because fewer sub-blocks are used for prediction in each direction (e.g., 4×8 sub-blocks as opposed to 8×8 sub-blocks), the bandwidth usage is better than or on par with the existing sub-block based methods. At the same time, the prediction results can be improved by using larger sub-blocks.

In some embodiments, a single non-uniform pattern can be used in each uni-predicted block. For example, for each list L (e.g., L0 or L1), the block is divided into a different pattern (e.g., as shown in FIG. 19E or FIG. 19F). The use of a smaller number of sub-blocks reduces the demand on bandwidth. The non-uniformity of the sub-blocks also increases robustness of the prediction results.

In some embodiments, for a multiple-hypothesis coded block, there can be more than one prediction blocks generated by different dividing patterns for each prediction direction (or reference picture list). Multiple prediction blocks can be used to generate the final prediction with additional weights applied. For example, the additional weights may be set to 1/M wherein M is the total number of generated prediction blocks.

In some embodiments, the encoder can determine whether and how to apply the interweaved prediction. The encoder then can transmit information corresponding to the determination to the decoder at a sequence level, a picture level, a view level, a slice level, a coding tree unit (CTU) (also known as a largest coding unit (LCU)) level, a CU level, a PU level, a transform unit (TU) level, or a region level (which may include multiple CUs/PUs/TUs/LCUs). The information can be signaled in a sequence parameter set (SPS), a video parameter set (VPS), a picture parameter set (PPS), a slice header (SH), a CTU/LCU, a CU, a PU, a TU, or a first block of a region.

In some implementations, the interweaved prediction applies to existing sub-block methods like the affine prediction, ATMVP, STMVP, FRUC, or BIO. In such cases, no additional signaling cost is needed. In some implementations, new sub-block merge candidates generated by the interweaved prediction can be inserted into a merge list, e.g., interweaved prediction+ATMVP, interweaved prediction+STMVP, interweaved prediction+FRUC, etc.

In some embodiments, the dividing patterns to be used by the current block can be derived based on information from spatial and/or temporal neighboring blocks. For example, instead of relying on the encoder to signal the relevant information, both encoder and decoder can adopt a set of predetermined rules to obtain dividing patterns based on temporal adjacency (e.g., previously used dividing patterns of the same block) or spatial adjacency (e.g., dividing patterns used by neighboring blocks).

In some embodiments, the weighting values w can be fixed. For example, all dividing patterns can be weighted equally: $w_i(x, y)=1$. In some embodiments, the weighting values can be determined based on positions of blocks as well as the dividing patterns used. For example, $w_i(x, y)$ may be different for different (x, y). In some embodiments, the weighting values may further depend on the sub-block prediction based coding techniques (e.g., affine, or ATMVP) and/or other coded information (e.g., skip or non-skip modes, and/or MV information).

In some embodiments, the encoder can determine the weighting values, and transmit the values to the decoder at sequence level, picture level, slice level, CTU/LCU level, CU level, PU level, or region level (which may include multiple CUs/PUs/TUs/LCUs). The weighting values can be signaled in a sequence parameter set (SPS), a picture parameter set (PPS), a slice header (SH), a CTU/LCU, a CU, a PU, or a first block of a region. In some embodiments, the weighting values can be derived from the weighting values of a spatial and/or temporal neighboring block.

It is noted that the interweaved prediction techniques disclosed herein can be applied in one, some, or all coding techniques of sub-block based prediction. For example, the interweaved prediction techniques can be applied to affine prediction, while other coding techniques of sub-block based prediction (e.g., ATMVP, STMVP, FRUC or BIO) do not use the interweaved prediction. As another exmaple, all of affine, ATMVP, and STMVP apply the interweaved prediction techniques disclosed herein.

Figure 20:
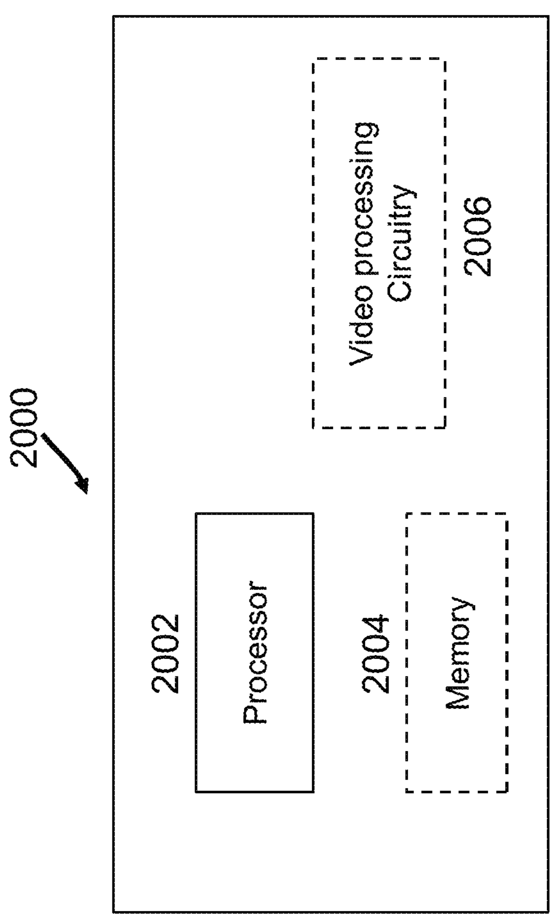
FIG. 20 is a block diagram of an example of a hardware platform for implementing a visual media decoding or a visual media encoding technique described in the present disclosure.

FIG. 20 is a block diagram of an example video bitstream processing apparatus 2000. The apparatus 2000 may be used to implement one or more of the methods described herein. The apparatus 2000 may be embodied in a smartphone, tablet, computer, Internet of Things (IoT) receiver, and so on. The apparatus 2000 may include one or more processors 2002, one or more memories 2004 and video processing hardware 2006. The processor(s) 2002 may be configured to implement one or more methods described in the present disclosure. The memory (memories) 2004 may be used for storing data and code used for implementing the methods and techniques described herein. The video processing hardware 2006 may be used to implement, in hardware circuitry, some techniques described in the present disclosure. Note that partial or full externality of memory 2004 and circuitry 2006 from the processor 2002 electronics is optional and is an implementation choice.

Figure 21:
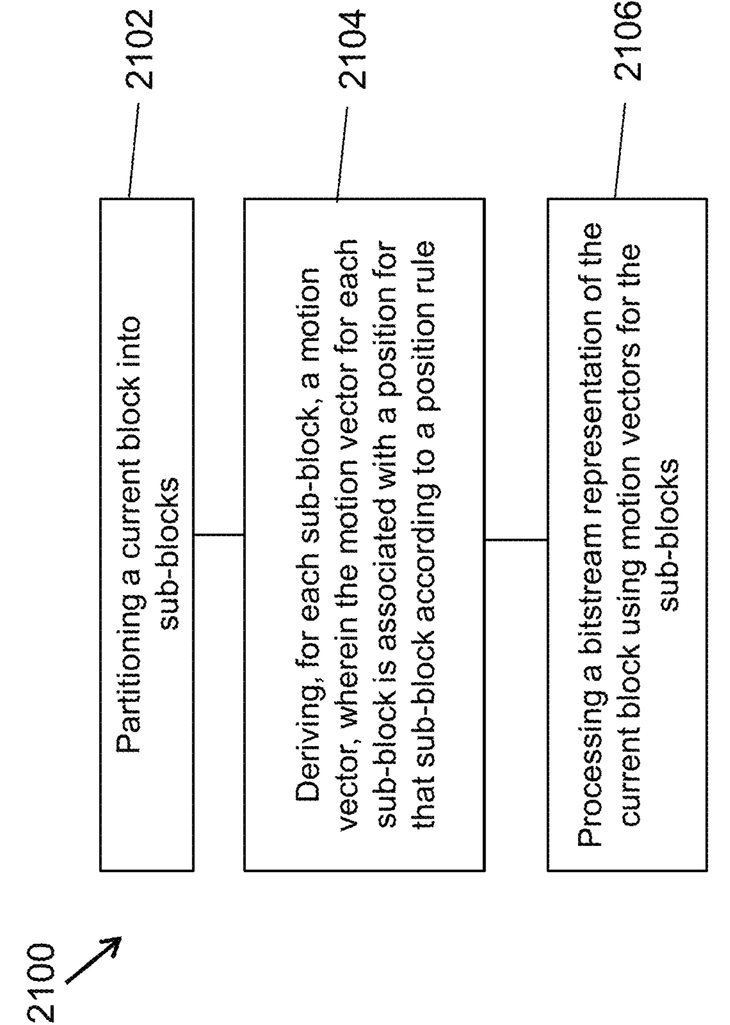
FIG. 21 is a flowchart for an example method of video processing.

FIG. 21 shows a flowchart for an example method 2100 for video processing. The method 2100 includes partitioning (2102) a current block into sub-blocks. The method 2100 further includes deriving (2104), for each sub-block, a motion vector, wherein the motion vector for each sub-block is associated with a position for that sub-block according to a position rule. The method 2100 further includes processing (2106) a bitstream representation of the current block using motion vectors for the sub-blocks.

Figure 22:
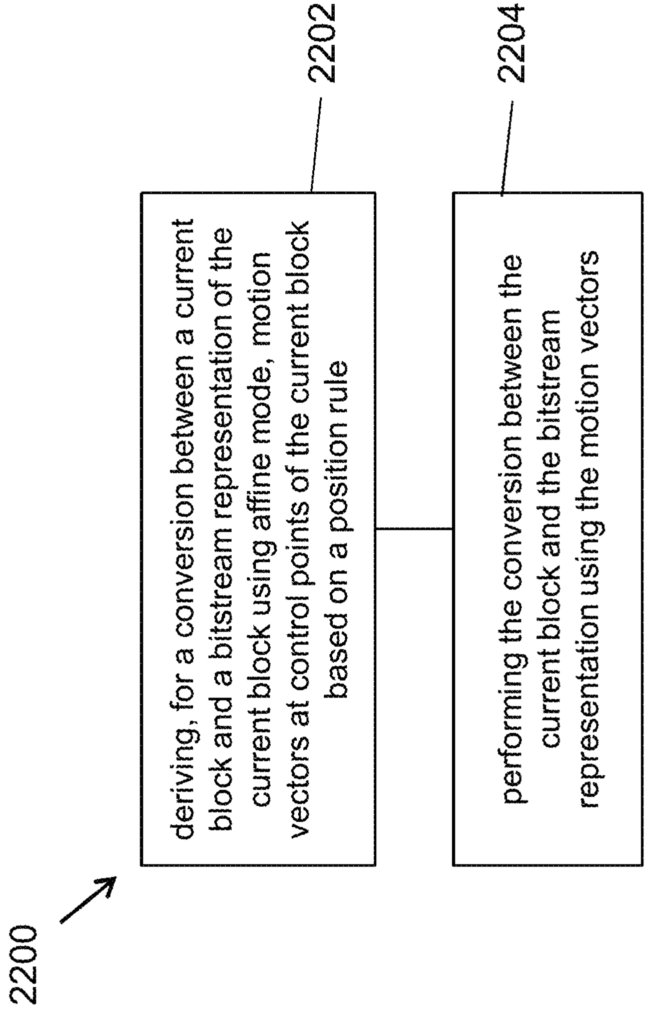
FIG. 22 is a flowchart for another example method of video processing.

FIG. 22 is a flowchart for an example method 2200 for video processing. The method 2200 includes deriving (2202), for a conversion between a current block and a bitstream representation of the current block using affine mode, motion vectors at control points of the current block based on a position rule. The method 2200 further includes performing (2204) the conversion between the current block and the bitstream representation using the motion vectors. In some implementations, the position rule may specify to exclude the use of non-adjacent neighboring blocks for the deriving. In some implementations, the motion vectors may be derived without using information of a neighboring coding unit that includes at least one non-adjacent 4×4 block of the current block. In some implementations, the method further includes storing and reusing at least some affine parameters of a previously converted neighboring block. In some implementations, the storing and the reusing of at least some affine parameters can be performed in two steps separately from each other.

Figure 23:
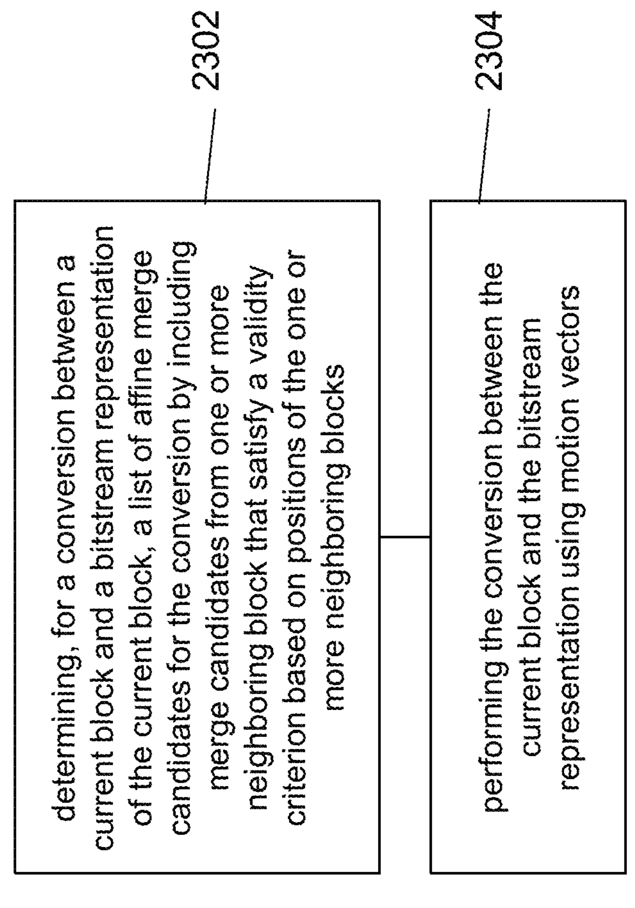
FIG. 23 is a flowchart for another example method of video processing.

FIG. 23 is a flowchart for an example method 2300 for video processing. The method 2300 includes determining (2302), for a conversion between a current block and a bitstream representation of the current block, a list of affine merge candidates for the conversion by including merge candidates from one or more neighboring block that satisfy a validity criterion based on positions of the one or more neighboring blocks. The method 2300 further includes performing (2304) the conversion between the current block and the bitstream representation using the motion vectors.

Additional features and embodiments of the above-described methods/techniques are described below using a clause-based description format.

1. A method of video processing (e.g., method 2100 shown in FIG. 21), comprising: partitioning a current block into sub-blocks; deriving, for each sub-block, a motion vector, wherein the motion vector for each sub-block is associated with a position for that sub-block according to a position rule; and processing a bitstream representation of the current block using motion vectors for the sub-blocks.
2. The method of clause 1, wherein the position rule specifies that the position is a center of a corresponding sub-block.
3. The method of clause 2, wherein the corresponding sub-block has a size M×N and the center is defined as ((M>>1)+a)×((N>>1)+b), wherein M and N are natural numbers and a, b is 0 or −1.
4. The method of clause 1, wherein the position rule specifies that the position is a non-center position of a corresponding sub-block.
5. The method of clause 1, wherein positions specified by the position rule result in motion vectors being derived at different positions in different sub-blocks.
6. A video processing method (e.g., method 2200 shown in FIG. 22), comprising: deriving, for a conversion between a current block and a bitstream representation of the current block using affine mode, motion vectors at control points of the current block based on a position rule; and performing the conversion between the current block and the bitstream representation using the motion vectors, and wherein the position rule specifies to exclude use of non-adjacent neighboring blocks for the deriving.
7. The method of clause 6, wherein motion vectors are derived without using information of a neighboring coding unit that includes at least one non-adjacent 4×4 block of the current block.
8. The method of clause 7, further including: storing and reusing at least some affine parameters of a previously converted neighboring block.
9. The method of clause 8, wherein the current block inherits the at least some affine parameters from at a neighboring block coded in affine mode.
10. The method of clause 8, wherein the at least some affine parameters are different for list0 and list1 reference frames.
11. The method of clause 8, wherein the at least some affine parameters comprise two sets, each for one of a multiple hypothesis reference picture list.
12. The method of any of clauses 8 to 11, wherein the at least some affine parameters comprise two of four affine parameters.
13. The method of clause 6, wherein a motion vector ($v_{0x}$, $v_{0y}$) of a top-left corner of the current block is derived from blocks adjacent to the top-left corner of the current block and the current block is merged to a neighboring block coded with the affine mode.
14. The method of clause 13, further including: using three neighboring blocks R, S, and T having corresponding motion vectors MV(R), MV(S), and MV(T), respectively, to derive the motion vector ($v_{0x}$, $v_{0y}$), and wherein the motion vector ($v_{0x}$, $v_{0y}$) is set equal to MV(X) and X is R, S or T, if X is inter-coded.
15. The method of clause 13, further including: using three neighboring blocks R, S, and T having corresponding motion vectors MV(R), MV(S), and MV(T), respectively, to derive the motion vector ($v_{0x}$, $v_{0y}$), and wherein the motion vector ($v_{0x}$, $v_{0y}$) is set equal to an average of MV(R), MV(S) and MV(T), if R, S and T are inter-coded.
16. The method of clause 13, further including: using three neighboring blocks R, S, and T having corresponding motion vectors MV(R), MV(S), and MV(T), respectively, to derive the motion vector ($v_{0x}$, $v_{0y}$), and wherein the motion vector ($v_{0x}$, $v_{0y}$) is set equal to an average of MV(X) and MV(Y) and X and Y is R, S, or T, if X and Y are inter-coded.

17. The method of clause 13, wherein the motion vector $(v_{0x}, v_{0y})$ is derived from motion vectors of temporal neighboring blocks.
18. The method of clause 13, wherein the motion vector $(v_{0x}, v_{0y})$ is scaled to a reference of the neighboring block.
19. The method of clause 6, wherein the motion vectors are derived from left adjacent blocks coded with the affine mode.
20. The method of clause 6, wherein motion vectors of a block coded with the affine mode are derived from S top adjacent blocks coded with the affine mode, S being equal to 2 for four parameter affine mode.
21. The method of clause 20, wherein a distance between two top adjacent blocks is a fixed number in a form of $2^N$, N being an integer.
22. The method of clause 20, wherein a distance between the top adjacent blocks depends on a height of the block coded with the affine mode.
23. The method of clause 20, wherein a distance between the top adjacent blocks is derived as a maximum length satisfying that all top adjacent blocks are coded with the affine mode and share a same reference picture.
24. The method of clause 20, wherein a motion vector $(mv_0^x, mv_0^y)$ at a top-left control point of the current block is derived as i) $mv_0^x = mvT_0^x - a\Phi$ and $mv_0^y = mvT_0^y - b\Phi$ or ii) $mv_0^x = mvT_1^x - a\Phi$, $mv_0^y = mvT_1^y - b\Phi$, $\Phi$ being a distance between the top-left control point and one of two top adjacent blocks T0 and T1 coded with the affine mode.
25. The method of clause 6, wherein the current block has a size of M×N pixels, where M and N are integers, and the motion vectors are derived from left side adjacent blocks when M<N.
26. The method of clause 6, wherein the current block has a size of M×N pixels, where M and N are integers, and the motion vectors are derived from top side adjacent blocks when M>N.
27. The method of clause 6, wherein the current block has a size of M×N pixels, where M and N are integers, and the motion vectors are derived from blocks adjacent to top-left corner when M=N.
28. A method of video processing (e.g., method 2300 shown in FIG. 23), comprising: determining, for a conversion between a current block and a bitstream representation of the current block, a list of affine merge candidates for the conversion by including merge candidates from one or more neighboring block that satisfy a validity criterion based on positions of the one or more neighboring blocks; and performing the conversion between the current block and the bitstream representation using motion vectors.
29. The method of clause 28, wherein a neighboring block is from a CTU (coding tree unit) that is different from a current CTU, and wherein an affine merge mode candidate from the neighboring block is invalid.
30. The method of clause 28, wherein a current CTU belongs to a current CTU line, wherein the neighboring block belongs to a CTU line different from the current CTU line, and wherein the affine merge mode candidate from the neighboring block is invalid.
31. The method of clause 28, wherein the current block belongs to a current slice, wherein the neighboring block belongs to a slice different from the current slice, and wherein the affine merge mode candidate from the neighboring block is invalid.
32. The method of clause 28, wherein the current block belongs to a current tile, wherein the neighboring block belongs to a tile different from the current tile, and wherein the affine merge mode candidate from the neighboring block is invalid.
33. A video coding method, comprising: deriving, for a conversion between a current block and a bitstream representation of the current block using affine mode, motion vectors at control points of the current block based on one or more adjacent neighboring blocks; and performing the conversion between the current block and the bitstream representation using the motion vectors.
33. The method of clause 33, wherein the motion vectors at control points of the current block using affine mode are inherited from the one or more above adjacent neighboring blocks.
34. The method of clause 33, wherein the adjacent neighboring blocks are also coded by affine mode.
35. The method of clause 34, wherein the adjacent neighboring blocks are coded by 4-parameter affine mode.
36. The method of clause 35, wherein the motion vectors at control points of the current block using affine mode are inherited from bottom-left and bottom-right control point motion vector of the one or more adjacent neighboring blocks.
37. The method of any of above clauses wherein the conversion included generating the bitstream representation from the current block.
38. The method of any of above clauses wherein the conversion included generating the current block from the bitstream representation.
39. A video decoding apparatus comprising a processor configured to implement a method recited in one or more of clauses 1 to 34.
40. A video encoding apparatus comprising a processor configured to implement a method recited in one or more of clauses 1 to 34.
41. A computer-readable program medium having code stored thereupon, the code comprising instructions that, when executed by a processor, causing the processor to implement a method recited in one or more of clauses 1 to 34.

From the foregoing, it will be appreciated that specific embodiments of the presently disclosed embodiments have been described herein for purposes of illustration, but that various modifications may be made without deviating from the scope of the disclosure. Accordingly, the presently disclosed embodiments is not limited except as by the appended claims.

The disclosed and other embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While the present disclosure contains many specifics, these should not be construed as limitations on the scope of any embodiment or of what may be claimed, but rather as descriptions of features that may be specific to particular embodiments of particular disclosures. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method of coding video data, comprising:

determining, for a conversion between a current video block of a video and a bitstream of the video, motion vectors at control points (CPMV) of the current video block based on a rule, wherein the rule specifies to exclude using of a non-adjacent neighboring block from one or more neighboring blocks of the current video block; and performing the conversion between the current video block and the bitstream based on the motion vectors, wherein the rule further specifies to exclude using of an invalid neighboring block from the one or more neighboring blocks based on positions of the one or more neighboring blocks, wherein the current video block belongs to a current tile, and a neighboring block of the one or more neighboring blocks is invalid in a case that the neighboring block belongs to a tile different from the current tile, and wherein the rule specifies that for a merge affine mode, one CPMV candidate of the current video block is derived from motion vectors from top-left adjacent blocks coded with an affine mode without considering left adjacent blocks coded with the affine mode, and the one CPMV candidate is used to derive the CPMVs of the current video block.

2. The method of claim 1, wherein the current video block belongs to a current slice, and a neighboring block of the one or more neighboring blocks is invalid in a case that the neighboring block belongs to a slice different from the current slice.

3. The method of claim 1, wherein the current video block includes multiple sub-blocks, and performing the conversion comprises determining a motion vector for each sub-block of the multiple sub-blocks based on the CPMV and a specific position of the corresponding sub-block.

4. The method of claim 3, wherein the specific position is a center of the corresponding sub-block.

5. The method of claim 4, wherein the corresponding sub-block has a size M×N and the center is defined as $[(M>>1)+a, (N>>1)+b]$, wherein M and N are natural numbers and a, b is 0 or −1.

6. The method of claim 1, wherein the conversion includes encoding the current video block into the bitstream.

7. The method of claim 1, wherein the conversion includes decoding the current video block from the bitstream.

8. An apparatus for processing video data comprising a processor and a non-transitory memory with instructions thereon, wherein the instructions upon execution by the processor, cause the processor to:

determine, for a conversion between a current video block of a video and a bitstream of the video, motion vectors at control points (CPMV) of the current video block based on a rule, wherein the rule specifies to exclude using of a non-adjacent neighboring block from one or more neighboring blocks of the current video block; and perform the conversion between the current video block and the bitstream based on the motion vectors, wherein the rule further specifies to exclude using of an invalid neighboring block from the one or more neighboring blocks based on positions of the one or more neighboring blocks, wherein the current video block belongs to a current tile, and a neighboring block of the one or more neighboring blocks is invalid in a case that the neighboring block belongs to a tile different from the current tile, and wherein the rule specifies that for a merge affine mode, one CPMV candidate of the current video block is derived from motion vectors from top-left adjacent blocks coded with an affine mode without considering left adjacent blocks coded with the affine mode, and the one CPMV candidate is used to derive the CPMVs of the current video block.

9. The apparatus of claim 8, wherein the current video block belongs to a current slice, and a neighboring block of the one or more neighboring blocks is invalid in a case that the neighboring block belongs to a slice different from the current slice.

10. The apparatus of claim 8, wherein the current video block includes multiple sub-blocks, and performing the conversion comprises determining a motion vector for each sub-block of the multiple sub-blocks based on the CPMV and a specific position of the corresponding sub-block.

11. The apparatus of claim 10, wherein the specific position is a center of the corresponding sub-block.

12. The apparatus of claim 11, wherein the corresponding sub-block has a size M×N and the center is defined as [(M>>1)+a, (N>>1)+b], wherein M and N are natural numbers and a, b is 0 or −1.

13. A non-transitory computer-readable storage medium storing instructions that cause a processor to:

determine, for a conversion between a current video block of a video and a bitstream of the video, motion vectors at control points (CPMV) of the current video block based on a rule, wherein the rule specifies to exclude using of non-adjacent neighboring block from one or more neighboring blocks of the current video block; and perform the conversion between the current video block and the bitstream based on the motion vectors, wherein the rule further specifies to exclude using of an invalid neighboring block from the one or more neighboring blocks based on positions of the one or more neighboring blocks, wherein the current video block belongs to a current tile, and a neighboring block of the one or more neighboring blocks is invalid in a case that the neighboring block belongs to a tile different from the current tile, and wherein the rule specifies that for a merge affine mode, one CPMV candidate of the current video block is derived from motion vectors from top-left adjacent blocks coded with an affine mode without considering left adjacent blocks coded with the affine mode, and the one CPMV candidate is used to derive the CPMVs of the current video block.

14. The non-transitory computer-readable storage medium of claim 13, wherein the current video block includes multiple sub-blocks, and performing the conversion comprises determining a motion vector for each sub-block of the multiple sub-blocks based on the CPMV and a specific position of the corresponding sub-block.

15. The non-transitory computer-readable storage medium of claim 14, wherein the specific position is a center of the corresponding sub-block.

16. A method for storing bitstream of a video, comprising:

determining, for a current video block of a video, motion vectors at control points (CPMV) of the current video block based on a rule, wherein the rule specifies to exclude using of non-adjacent neighboring block from one or more neighboring blocks of the current video block;

generating the bitstream from the current video block based on the determining, and storing the bitstream in a non-transitory computer-readable recording medium, wherein the rule further specifies to exclude using of an invalid neighboring block from the one or more neighboring blocks based on positions of the one or more neighboring blocks, wherein the current video block belongs to a current tile, and a neighboring block of the one or more neighboring blocks is invalid in a case that the neighboring block belongs to a tile different from the current tile, and wherein the rule specifies that for a merge affine mode, one CPMV candidate of the current video block is derived from motion vectors from top-left adjacent blocks coded with an affine mode without considering left adjacent blocks coded with the affine mode, and the one CPMV candidate is used to derive the CPMVs of the current video block.

17. The method of claim 16, wherein the current video block includes multiple sub-blocks, and the generating comprises determining a motion vector for each sub-block of the multiple sub-blocks based on the CPMV and a specific position of the corresponding sub-block.

18. The method of claim 17, wherein the specific position is a center of the corresponding sub-block.

* * * * *